United States Patent
Takiguchi et al.

(10) Patent No.: US 10,199,887 B2
(45) Date of Patent: Feb. 5, 2019

(54) ROTARY ELECTRIC MACHINE ARMATURE CORE AND ROTARY ELECTRIC MACHINE

(71) Applicant: MITSUBISHI ELECTRIC CORPORATION, Chiyoda-ku (JP)

(72) Inventors: Ryuichi Takiguchi, Chiyoda-ku (JP); Akira Hashimoto, Chiyoda-ku (JP); Takanori Komatsu, Chiyoda-ku (JP); Katsunori Oki, Chiyoda-ku (JP); Satoru Hasegawa, Chiyoda-ku (JP); Susumu Oshima, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 219 days.

(21) Appl. No.: 15/123,134

(22) PCT Filed: Mar. 26, 2014

(86) PCT No.: PCT/JP2014/058629
§ 371 (c)(1),
(2) Date: Sep. 1, 2016

(87) PCT Pub. No.: WO2015/145631
PCT Pub. Date: Oct. 1, 2015

(65) Prior Publication Data
US 2017/0117761 A1 Apr. 27, 2017

(51) Int. Cl.
*H02K 1/27* (2006.01)
*H02K 1/14* (2006.01)
(Continued)

(52) U.S. Cl.
CPC .......... *H02K 1/148* (2013.01); *H02K 1/2706* (2013.01); *H02K 3/325* (2013.01); *H02K 15/022* (2013.01);
(Continued)

(58) Field of Classification Search
CPC ............ H02K 1/27; H02K 15/02; H02K 3/32; H02K 1/14; H02K 1/18; H02K 1/06; H02K 2201/15
See application file for complete search history.

(56) References Cited

U.S. PATENT DOCUMENTS 8,344,580 B2 * 1/2013 Rau ...................... H02K 1/165
310/216.069
2002/0075121 A1 6/2002 Akita et al.
(Continued)

FOREIGN PATENT DOCUMENTS

JP 2000-201458 A 7/2000
JP 2009-254086 A 10/2009
(Continued)

OTHER PUBLICATIONS

International Search Report dated Jul. 1, 2014 in PCT/JP2014/058629 filed Mar. 26, 2014.
(Continued)

Primary Examiner — Joshua Benitez Rosario
Assistant Examiner — Leda Pham
(74) Attorney, Agent, or Firm — Xsensus LLP

(57) ABSTRACT

A core segment linked body when opened out rectilinearly is configured: such that a distance between adjacent width reduced portions is greater than a width dimension of width expanded portions when adjacent core segments are in an expanded position, and the distance between the adjacent width reduced portions is less than the width dimension of the width expanded portions when the adjacent core segments are in a contracted position; and so as to satisfy $(t_e - t_n)/\tau_s' > 0$, and $0 < (t_e - t_n)/t_e \leq 0.27$, where $\tau_s'$ is a distance between center lines of the adjacent magnetic pole teeth in the expanded position, $t_e$ is a width dimension of tooth main portions, and $t_n$ is the width dimension of the width reduced portions.

18 Claims, 17 Drawing Sheets

(51) Int. Cl.
*H02K 15/02* (2006.01)
*H02K 3/32* (2006.01)
(52) U.S. Cl.
CPC ..... *H02K 2213/03* (2013.01); *H02K 2213/12* (2013.01)

(56) References Cited

U.S. PATENT DOCUMENTS

2012/0248928 A1* 10/2012 Hashimoto ............ H02K 1/148
  310/216.009
2016/0218571 A1* 7/2016 Kusase .................. H02K 1/165

FOREIGN PATENT DOCUMENTS

| JP | 2010-98938 A | 4/2010 |
| JP | 2012-130153 A | 7/2012 |
| KR | 10-2013-0136549 A | 12/2013 |
| WO | 2011/125199 A1 | 10/2011 |
| WO | 2011/161806 A1 | 12/2011 |
| WO | 2012/095987 A1 | 7/2012 |
| WO | WO 2012/147212 A1 | 11/2012 |
| WO | 2013/021559 A1 | 2/2013 |

OTHER PUBLICATIONS

Korean Office Action dated Oct. 13, 2017 in Korean Patent Application No. 10-2016-7029086 (with English translation).

* cited by examiner

ROTARY ELECTRIC MACHINE ARMATURE CORE AND ROTARY ELECTRIC MACHINE

TECHNICAL FIELD

The present invention relates to a rotary electric machine such as an electric motor or a generator and a rotary electric machine armature core, and a particular object thereof is to improve productivity, materials yield, and characteristics, etc., of the armature core.

BACKGROUND ART

In conventional rotary electric machines, an armature core is configured by linking into an annular shape a plurality of core segments that have an approximate T shape that has a back yoke portion and a magnetic pole tooth portion that protrudes from the back yoke portion. Each of the core segments is configured by laminating a plurality of approximately T-shaped core pieces. When manufacturing armature cores, materials yield has been improved by arranging the core pieces in a staggered pattern such that the magnetic pole tooth portions of first core pieces are positioned between magnetic pole tooth portions of second core pieces and punching out two straight rows together (see Patent Literature 1, for example).

In other conventional rotary electric machines, an annular yoke is constituted by a plurality of laminated approximately T-shaped yoke pieces that are mutually rotatable, teeth are formed on the respective yoke pieces, and in the plurality of teeth, some gaps that are respectively formed between adjacent teeth are configured so as to be expandable in comparison with others. Winding of windings is facilitated, and loosening is also prevented from arising in crossover wires by deforming the annular yoke into a non-circular shape during the winding of the windings to expand some of the gaps that are respectively formed between adjacent teeth in comparison with others, and then winding the windings onto the teeth through the expanded gaps (see Patent Literature 2, for example).

CITATION LIST

Patent Literature

Patent Literature 1: International Publication No. WO/2011/125199 (Pamphlet)
Patent Literature 2: Japanese Patent Laid-Open No. 2010-98938 (Gazette)

SUMMARY OF THE INVENTION

Problem to be Solved by the Invention

In the conventional rotary electric machine that is disclosed in Patent Literature 1, notches in which magnetic pole tooth portion tips of the first core pieces are accommodated are disposed on magnetic pole tooth portion roots of the second core pieces in order to obtain two staggered straight rows of core pieces that constitute part of an armature core. Thus, if width dimensions of tip end portions (width expanded portions) of the magnetic pole tooth portions are increased, then the notches become larger, reducing torque. Furthermore, if the notches are reduced, then width dimensions of the width expanded portions are reduced, leading to worsening of torque pulsation.

In the conventional rotary electric machine that is disclosed in Patent Literature 2, because the gaps between some adjacent tooth are enlarged by deforming the annular yoke into a non-circular shape, the gaps between the teeth depend on the width dimensions of the tip end portions (the width expanded portions) of the teeth. Thus, if the width dimensions of the width expanded portions are increased in order to suppress worsening of torque pulsation, then the gaps between the expanded teeth become narrower, making workability when winding the windings poor. If a circumferential length of the back yoke portions of the yoke pieces is lengthened in order to suppress this deterioration of workability when winding the windings, then materials yield is reduced.

The present invention aims to solve the above problems and an object of the present invention is to provide a rotary electric machine armature core and a rotary electric machine that can improve materials yield, and that can improve productivity, without lowering characteristics of the rotary electric machine, even if width dimensions of width expanded portions of magnetic pole tooth portions are increased.

Means for Solving the Problem

A rotary electric machine armature core according to the present invention includes a core segment linked body that is configured by linking a plurality of core segments that each have a T shape that includes a back yoke portion and a magnetic pole tooth that protrudes from a central portion of the back yoke portion. A shaft portion is formed on a first longitudinal end portion of the back yoke portion, and an interfitting aperture is formed on a second end portion of the back yoke portion, the magnetic pole tooth includes: a tooth main portion that protrudes outward from the back yoke portion; a width reduced portion that is formed on the tooth main portion near the back yoke portion, the width reduced portion having a width dimension that is narrower than the tooth main portion; and a width expanded portion that is formed on a protruding end of the tooth main portion, the width expanded portion having a width dimension that is wider than the tooth main portion, the plurality of core segments are configured so as to be linked pivotably around the shaft portion by fitting the shaft portion of one of the core segments into the interfitting aperture of an adjacent core segment, so as to adopt a state that is opened out rectilinearly such that directions of protrusion of the magnetic pole teeth from the back yoke portions are parallel to each other and a state that is pivoted around the shaft portion so as to be bent into an arc shape, and the core segment linked body is configured so as to be displaceable in the state that is opened out rectilinearly between an expanded position in which a distance between center lines of the magnetic pole teeth of adjacent core segments is expanded and a contracted position in which the distance is contracted. The core segment linked body when opened out rectilinearly is configured: such that a distance between adjacent width reduced portions is greater than a width dimension of the width expanded portions when the adjacent core segments are in the expanded position, and the distance between the adjacent width reduced portions is less than the width dimension of the width expanded portions when the adjacent core segments are in the contracted position; and so as to satisfy (te−tn)/τs'>0, and 0<(te−tn)/te≤0.27, where τs' is the distance between the center lines of the adjacent magnetic pole teeth in the expanded position, te is a width dimension of the tooth main portions, and tn is the width dimension of the width reduced portions.

Effects of the Invention

In the present invention, because the core segments are displaceable between the expanded position and the contracted position relative to adjacent core segments, core segment linked bodies can be obtained as staggered straight row pairs by manufacturing the core segment linked bodies in a state in which the core segments are positioned in the expanded position, enabling materials yield to be improved.

Because the width dimensions of the width reduced portions are reduced and can be suppressed, torque reduction can be suppressed even if the width dimensions of the width expanded portions are increased. In addition, because the dimensions displaced between the expanded position and the contracted position relative to adjacent core segments can be suppressed by adjusting the width dimensions of the width reduced portions, materials yield can be improved when manufacturing the core segment linked body with the core segments positioned in the expanded position even if the width dimensions of the width expanded portions are increased, enabling productivity to be improved.

DESCRIPTION OF EMBODIMENTS

Preferred embodiments of a rotary electric machine armature core and a rotary electric machine according to the present invention will now be explained with reference to the drawings.

Embodiment 1

Figure 1:
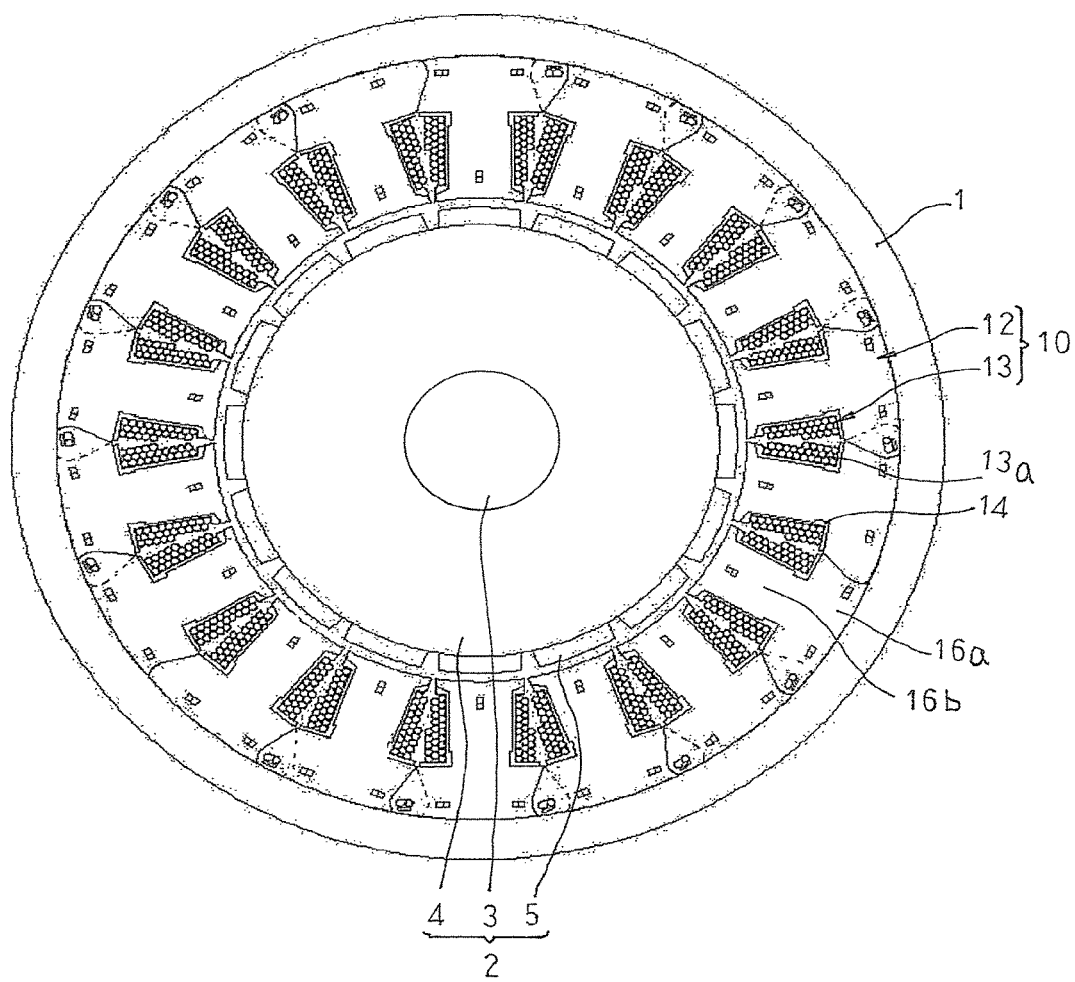
FIG. 1 is a plan that shows a rotary electric machine according to Embodiment 1 of the present invention.
Figure 2:
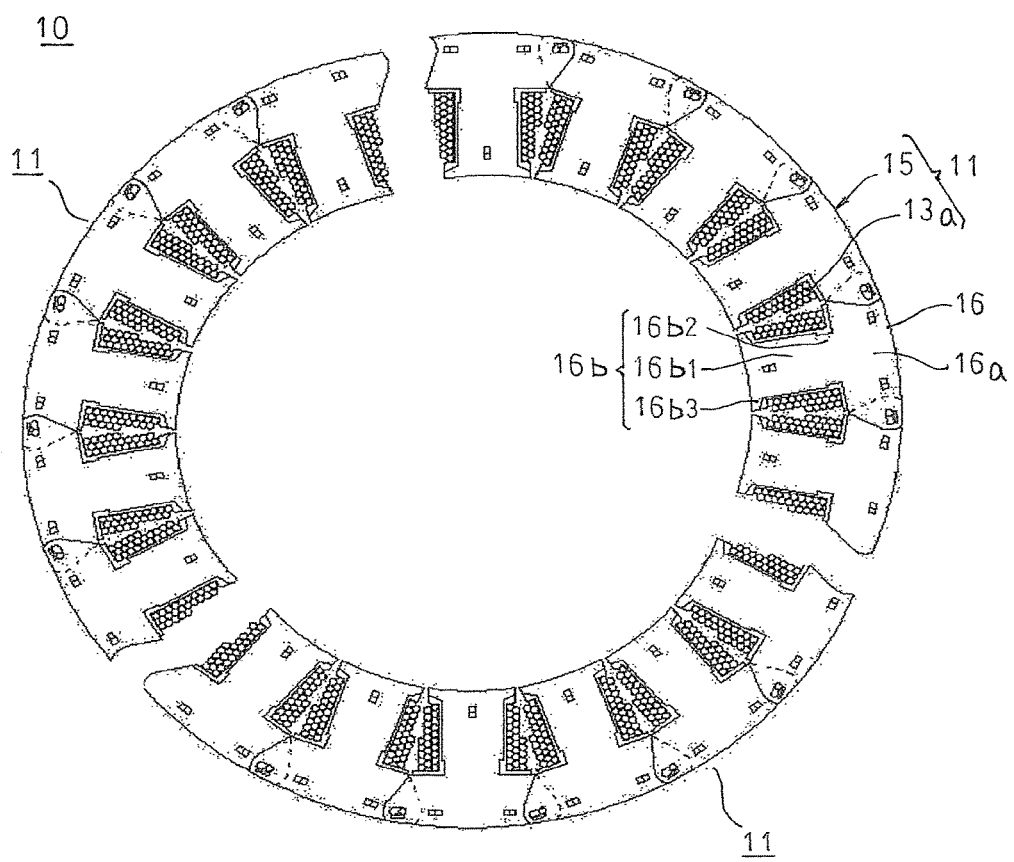
FIG. 2 is a plan that shows a state in which an armature is dismantled in the rotary electric machine according to Embodiment 1 of the present invention.
Figure 3:
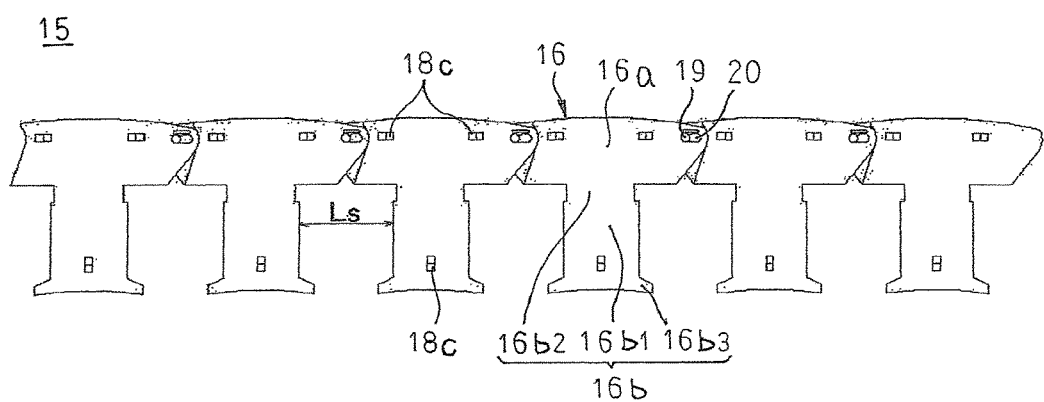
FIG. 3 is a plan that shows a state in which a core segment linked body that constitutes part of an armature segment is contracted in the rotary electric machine according to Embodiment 1 of the present invention.
Figure 4:
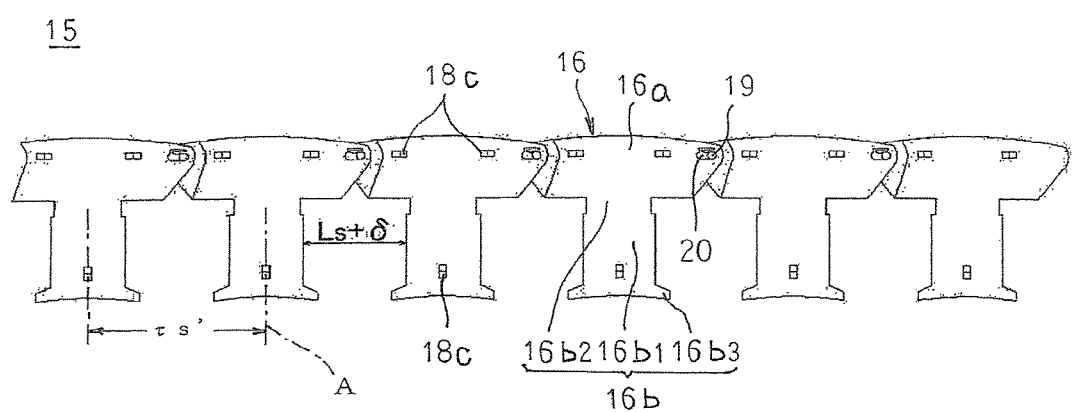
FIG. 4 is a plan that shows a state in which the core segment linked body that constitutes part of the armature segment is expanded in the rotary electric machine according to Embodiment 1 of the present invention.
Figure 5:
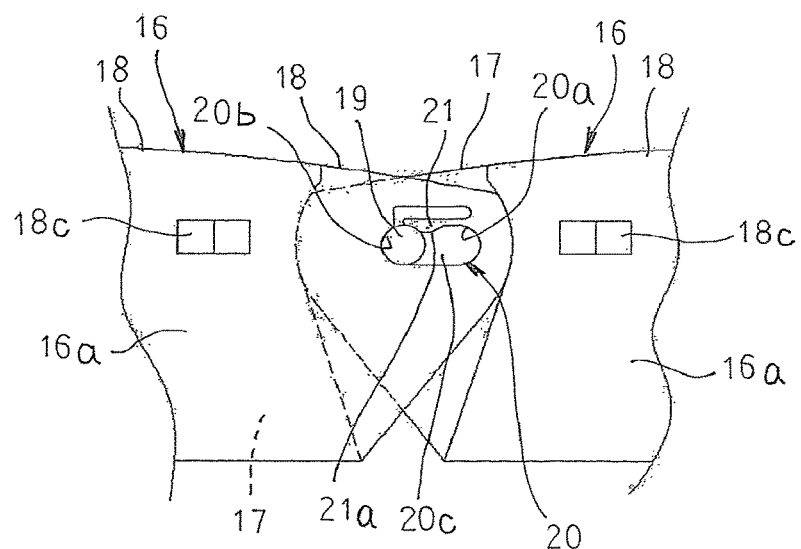
FIG. 5 is a partially enlarged plan that shows a vicinity of a shaft portion of the core segment linked body in the contracted state in the rotary electric machine according to Embodiment 1 of the present invention.
Figure 6:
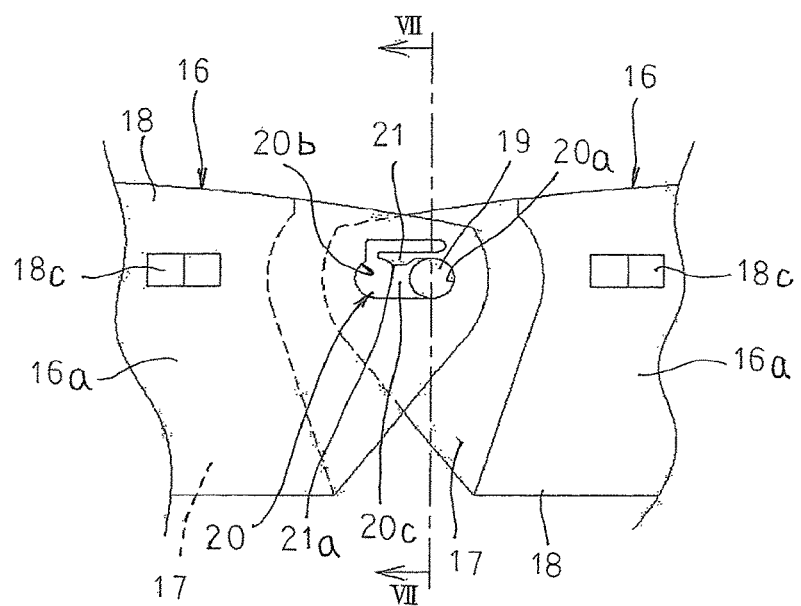
FIG. 6 is a partially enlarged plan that shows a vicinity of the shaft portion of the core segment linked body in the expanded state in the rotary electric machine according to Embodiment 1 of the present invention.
Figure 7:
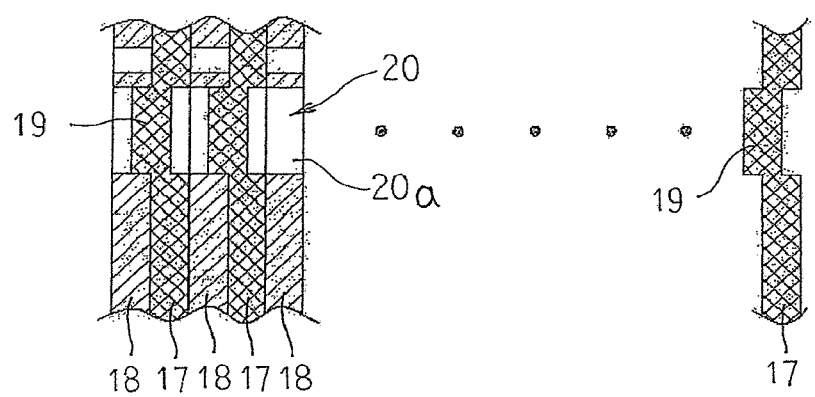
FIG. 7 is a cross section that is taken along Line VII-VII in FIG. 6 so as to be viewed in the direction of the arrows.
Figure 8:
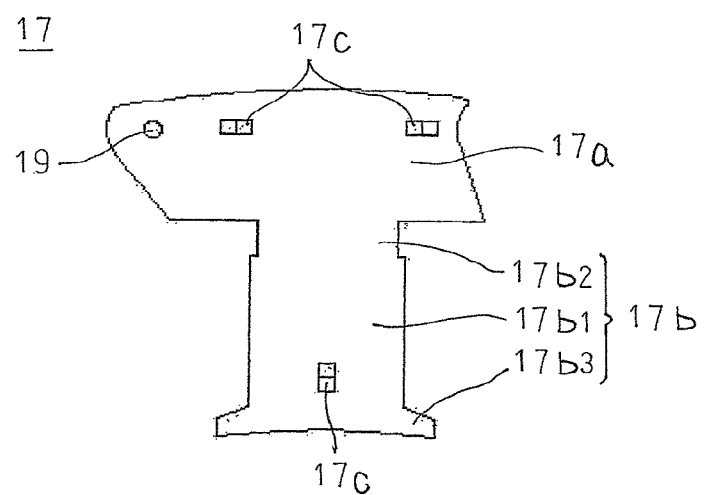
FIG. 8 is a plan that shows a first core lamination that constitutes part of a core segment in the rotary electric machine according to Embodiment 1 of the present invention.
Figure 9:
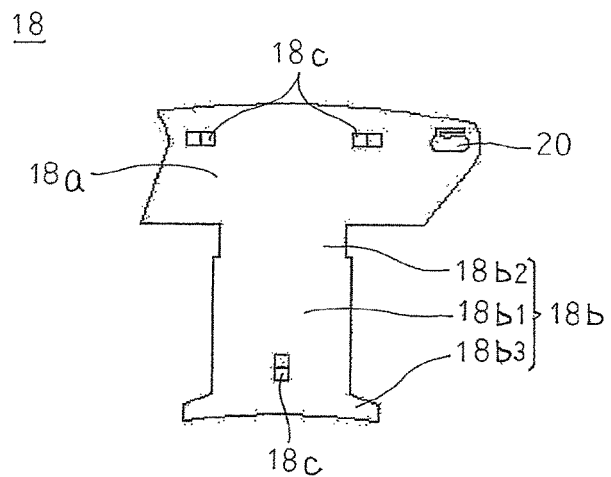
FIG. 9 is a plan that shows a second core lamination that constitutes part of the core segment in the rotary electric machine according to Embodiment 1 of the present invention.

FIG. 1 is a plan that shows a rotary electric machine according to Embodiment 1 of the present invention, FIG. 2 is a plan that shows a state in which an armature is dismantled in the rotary electric machine according to Embodiment 1 of the present invention, FIG. 3 is a plan that shows a state in which a core segment linked body that constitutes part of an armature segment is contracted in the rotary electric machine according to Embodiment 1 of the present invention, FIG. 4 is a plan that shows a state in which the core segment linked body that constitutes part of the armature segment is expanded in the rotary electric machine according to Embodiment 1 of the present invention, FIG. 5 is a partially enlarged plan that shows a vicinity of a shaft portion of the core segment linked body in the contracted state in the rotary electric machine according to Embodiment 1 of the present invention, FIG. 6 is a partially enlarged plan that shows a vicinity of the shaft portion of the core segment linked body in the expanded state in the rotary electric machine according to Embodiment 1 of the present invention, FIG. 7 is a cross section that is taken along Line VII-VII in FIG. 6 so as to be viewed in the direction of the arrows, FIG. 8 is a plan that shows a first core lamination that constitutes part of a core segment in the rotary electric machine according to Embodiment 1 of the present invention, and FIG. 9 is a plan that shows a second core lamination that constitutes part of the core segment in the rotary electric machine according to Embodiment 1 of the present invention.

In FIG. 1, a rotary electric machine 100 includes: a rotor 2 that is fixed to a rotating shaft 3 that is rotatably supported by an annular housing 1 so as to be disposed inside the housing 1; and an armature 10 that is held by the housing 1 so as to surround the rotor 2 such that a constant air gap is interposed between the armature 10 and the rotor 2.

The rotor 2 includes: the rotating shaft 3; a rotor core 4 that is fixed to the rotating shaft 3, which is inserted at a central position thereof; and permanent magnets 5 that are disposed on an outer circumferential surface of the rotor core 4. Here, sixteen permanent magnets 5 are disposed on the outer circumferential surface of the rotor core 4 at a uniform pitch in a circumferential direction.

The armature 10 includes: an armature core 12 in which a plurality of magnetic pole teeth 16b, in this case eighteen, are respectively disposed so as to project radially inward from an inner circumferential wall surface of an annular back yoke at a uniform pitch in a circumferential direction; and an armature coil 13 that is constituted by coils 13a that are produced by winding a conductor wire onto each of the magnetic pole teeth 16b so as to have insulators 14 interposed.

The armature 10 is configured into an annular shape by arranging three armature segments 11 in a circumferential direction, the armature segments 11 being configured into circular arc shapes that are shown in FIG. 2. The armature segments 11 are constituted by: core segment linked bodies 15 that are configured by consecutively linking six core segments 16; and the coils 13a that are mounted to each of the magnetic pole tooth 16b so as to have the insulators 14 interposed.

A first core lamination 17, as shown in FIG. 8, is formed so as to have an approximate T shape that has: a back yoke portion 17a; and a magnetic pole tooth portion 17b that protrudes from a longitudinally central portion of the back yoke portion 17a. A first longitudinal end portion of the back yoke portion 17a bulges outward convexly, and a second longitudinal end portion is hollowed out concavely. The magnetic pole tooth portion 17b includes: a tooth main portion 17b1 that protrudes from the longitudinally central portion of the back yoke portion 17a at a constant width; a width reduced portion 17b2 that is formed by reducing a width of a root portion of the tooth main portion 17b1; and a width expanded portion 17b3 that is formed by extending a protruding end of the tooth main portion 17b1 in two circumferential directions. Punch-crimped portions 17c are formed at two positions on the back yoke portion 17a, and at one position near a protruding end of the magnetic pole tooth portion 17b, for example. In addition, a shaft portion 19 is formed near a first longitudinal end of the back yoke portion 17a by lancing so as to have a tabular shape. This shaft portion 19 is disposed nearer to an outer circumferential side than a central position of a radial width of the back yoke portion 17a.

A second core lamination 18, as shown in FIG. 9, is formed so as to have an approximate T shape that has: a back yoke portion 18a; and a magnetic pole tooth portion 18b that protrudes from a longitudinally central portion of the back yoke portion 18a. A first longitudinal end portion of the back yoke portion 18a is hollowed out concavely, and a second longitudinal end portion bulges outward convexly. The magnetic pole tooth portion 18b includes: a tooth main portion 18b1 that protrudes from the longitudinally central portion of the back yoke portion 18a at a constant width; a width reduced portion 18b2 that is formed by reducing a width of a root portion of the tooth main portion 18b1; and a width expanded portion 18b3 that is formed by extending a protruding end of the tooth main portion 18b1 in two circumferential directions. Punch-crimped portions 18c are formed at two positions on the back yoke portion 18a, and at one position near a protruding end of the magnetic pole tooth portion 18b, for example. In addition, an interfitting aperture 20 is formed near a second longitudinal end of the back yoke portion 18a. This interfitting aperture 20 is disposed at a position that corresponds to the shaft portion 19, that is, nearer to an outer circumferential side than a central position of a radial width of the back yoke portion 18a.

The core segments 16 are produced by stacking a plurality of first core laminations 17 and second core segments 18 alternately and fixing the first and second core laminations 17 and 18 to each other using the punch-crimped portions 17c and 18c. Thus, the back yoke portions 17a and 18a are laminated and integrated to constitute circular arc-shaped back yoke portions 16a, and the magnetic pole tooth portions 17b and 18b are laminated and integrated to constitute the magnetic pole teeth 16*b*. In addition, the tooth main portions 17*b*1 and 18*b*1 are laminated and integrated to constitute tooth main portions 16*b*1, the width reduced portions 17*b*2 and 18*b*2 are laminated and integrated to constitute width reduced portions 16*b*2, and the width expanded portions 17*b*3 and 18*b*3 are laminated and integrated to constitute width expanded portions 16*b*3. The shaft portions 19, as shown in FIG. 7, are stacked together in the direction of lamination of the first and second core laminations 17 and 18 such that central axes are aligned. The interfitting apertures 20 are stacked together in the direction of lamination of the first and second core laminations 17 and 18 such that aperture shapes are aligned.

As shown in FIGS. 5 and 6, in a direction that is perpendicular to a longitudinal direction (a direction of protrusion) of the magnetic pole tooth portions 18*b*, in other words, a plane that is perpendicular to a central axis of the rotating shaft 3 of the rotary electric machine 100, the interfitting apertures 20 include: a first interfitting aperture 20*a* and a second interfitting aperture 20 that are spaced apart in a direction that is perpendicular (approximately perpendicular) to a center line that passes through the central axis of the rotating shaft 3 and a center of the magnetic pole teeth 16*b* in a width direction; and a linking aperture 20*c* that links the first interfitting aperture 20*a* and the second interfitting aperture 20*b*. A spring portion 21 is disposed on an outer circumferential side of the interfitting aperture 20 by forming a penetrating aperture on the back yoke portion 18*a* on the outer circumferential side of the interfitting aperture 20. A protruding portion 21*a* that positions the shaft portion 19 in either the first interfitting aperture 20*a* or the second interfitting aperture 20*b* is disposed on the spring portion 21 so as to protrude toward the linking aperture 20*c*.

Thus, as shown in FIG. 5, spacing between two core segments 16 is reduced by fitting the shaft portion 19 into the second interfitting aperture 20*b*. As shown in FIG. 6, the spacing between the two core segments 16 is expanded by fitting the shaft portion 19 into the first interfitting aperture 20*a*. When a separating force acts on the two core segments 16 in FIG. 5, motive force acts through the shaft portion 19 so as to push the protruding portion 21*a* upward, deforming the spring portion 21 elastically. The shaft portion 19 thereby moves through the linking aperture 20*c* toward the first interfitting aperture 20*a*. The spring portion 21 recovers once the shaft portion 19 has passed the protruding portion 21*a*. Thus, the force of recovery of the spring portion 21 acts on the shaft portion 19 by means of the protruding portion 21*a* such that the shaft portion 19 is pushed into the first interfitting aperture 20*a*, and is fitted together with the first interfitting aperture 20*a*. The spring portion 21 also deforms elastically in a similar manner during movement of the shaft portion 19 from the first interfitting aperture 20*a* to the second interfitting aperture 20*b*.

Thus, a force that elastically deforms the spring portion 21 is required when displacing the core segments 16 between a contracted position and an expanded position. The shaft portion 19 is thereby positioned in the first interfitting aperture 20*a* or the second interfitting aperture 20*b* by the spring portion 21. Furthermore, because the central axes of the shaft portions 19 of the stacked first core laminations 17 are aligned in the direction of lamination of the first and second core laminations 17 and 18, the core segments 16 are pivotable around the shaft portions 19.

The core segment linked bodies 15 are configured by linking six core segments 16 consecutively so as to be pivotable around the shaft portions 19 by fitting the shaft portion 19 of one core segment 16 into the interfitting aperture 20 of another core segment 16. As shown in FIG. 3, the six core segments 16 are opened out rectilinearly such that the magnetic pole teeth 16*b* are mutually parallel (a contracted position) by fitting the shaft portions 19 into the second interfitting apertures 20*b*. Furthermore, as shown in FIG. 4, the six core segments 16 are opened out rectilinearly such that the magnetic pole teeth 16*b* are mutually parallel at a pitch of $\tau s'$ (the expanded position) by fitting the shaft portions 19 into the first interfitting apertures 20*a*. Thus, the spacing between adjacent magnetic pole teeth 16*b* of the core segment linked bodies 15 are expandable and contractible between Ls and $(Ls+\delta)$. Moreover, $\tau s'$ is a spacing between center lines A that pass through centers in the width direction of the adjacent magnetic pole teeth 16*b* that are positioned in the expanded position.

Figure 10:
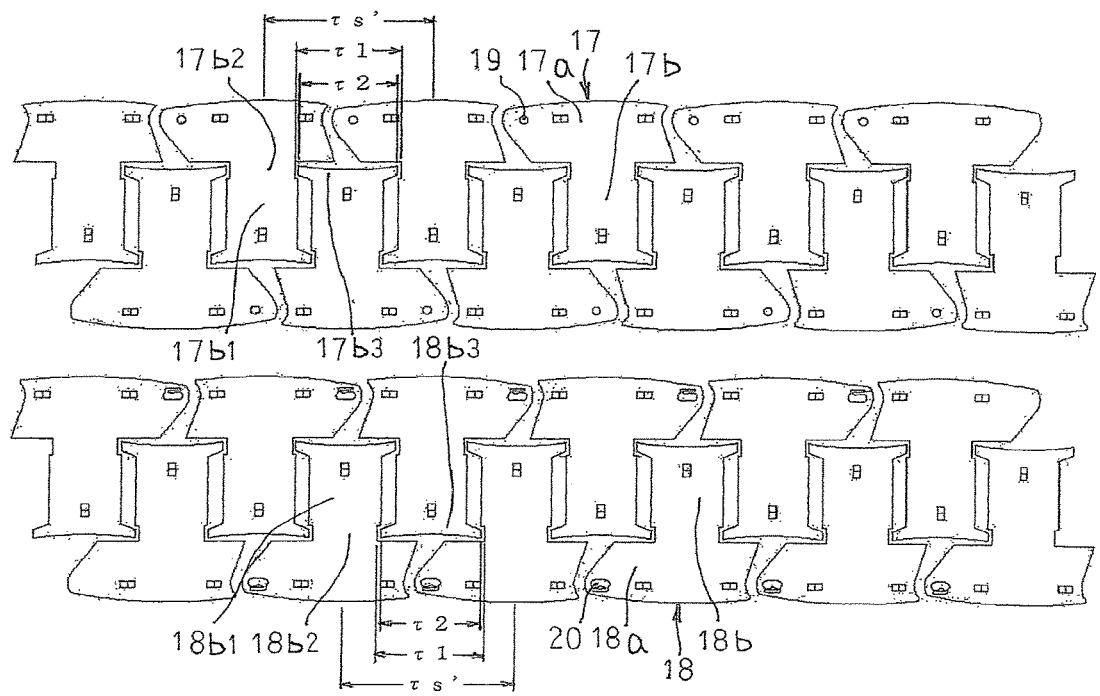
FIG. 10 is a plan that explains materials yield of core laminations in the rotary electric machine according to Embodiment 1 of the present invention.
Figure 11:
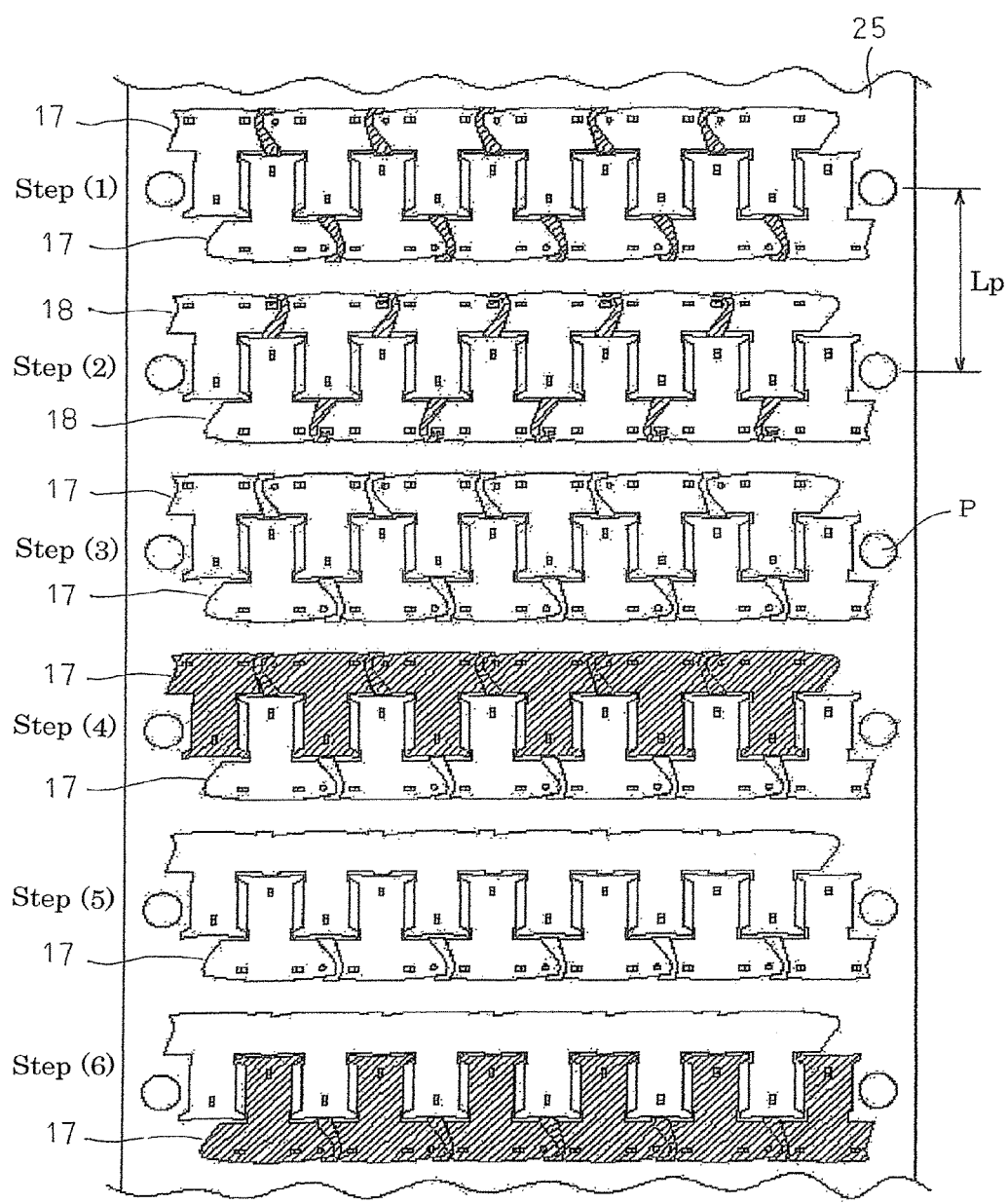
FIG. 11 is a diagram that explains a manufacturing method for core segment linked bodies according to Embodiment 1 of the present invention.
Figure 12:
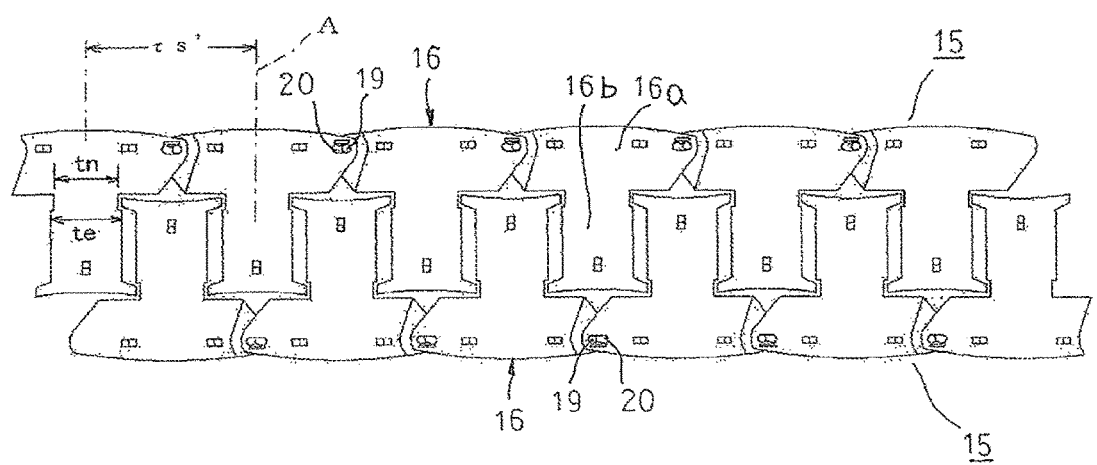
FIG. 12 is a plan that shows core segment linked bodies that have been manufactured according to the manufacturing method for core segment linked bodies according to Embodiment 1 of the present invention.
Figure 13:
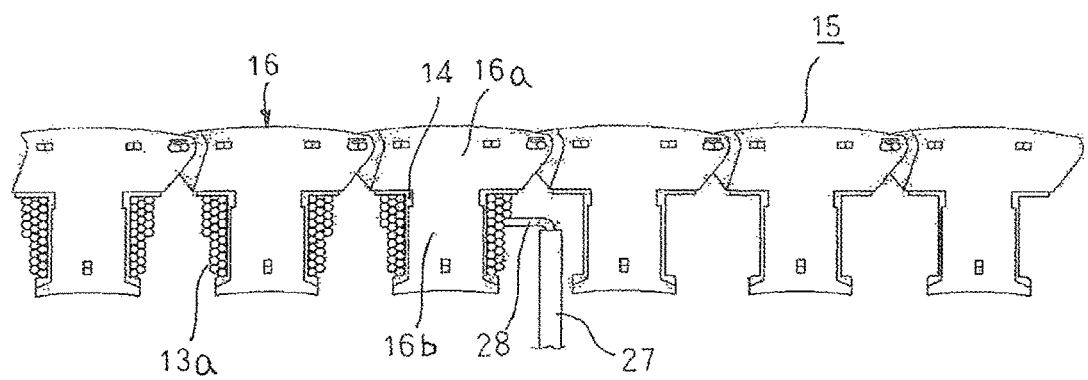
FIG. 13 is a plan that explains a manufacturing method for the armature segment according to Embodiment 1 of the present invention.
Figure 14:
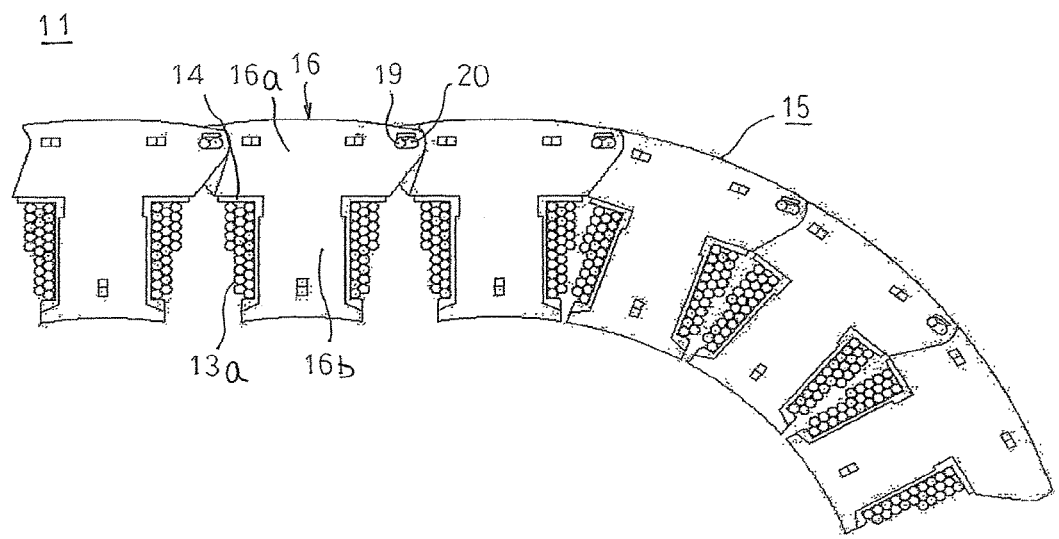
FIG. 14 is a plan that explains a step of bending the armature segment according to Embodiment 1 of the present invention into a circular arc shape.

Next, a manufacturing method for an armature will be explained with reference to FIGS. 10 through 14. FIG. 10 is a plan that explains materials yield of core laminations in the rotary electric machine according to Embodiment 1 of the present invention, FIG. 11 is a diagram that explains a manufacturing method for core segment linked bodies according to Embodiment 1 of the present invention, FIG. 12 is a plan that shows core segment linked bodies that have been manufactured according to the manufacturing method for core segment linked bodies according to Embodiment 1 of the present invention, FIG. 13 is a plan that explains a manufacturing method for the armature segment according to Embodiment 1 of the present invention, and FIG. 14 is a plan that explains a step of bending the armature segment according to Embodiment 1 of the present invention into a circular arc shape.

First, the materials yield of the first and second core laminations 17 and 18 will be explained with reference to FIG. 10.

Two first core lamination groups in which six first core laminations 17 are arranged rectilinearly in a single row at a pitch of $n\tau s'$ in the longitudinal direction of the back yoke portions 17*a* such that the magnetic pole tooth portions 17*b* are parallel form an arrangement known as a "staggered straight row pair" in which the magnetic pole tooth portions 17*b* of one first core lamination group are disposed in a reverse direction so as to be inserted between the magnetic pole tooth portions 17*b* of the other first core lamination group, and are punched out of a strip 25 of electromagnetic steel sheet, etc. Moreover, first longitudinal end portions of the back yoke portions 17*a* of the first core laminations 17 that are positioned at the first ends of the first core lamination groups are hollowed out concavely. Furthermore, second longitudinal end portions of the back yoke portions 17*a* of the first core laminations 17 that are positioned at the second ends of the first core lamination groups bulge outward convexly.

Similarly, two second core lamination groups in which six second core laminations 18 are arranged rectilinearly in a single row at a pitch of $n\tau s'$ in the longitudinal direction of the back yoke portions 18*a* such that the magnetic pole tooth portions 18*b* are parallel form an arrangement known as a "staggered straight row pair" in which the magnetic pole tooth portions 18*b* of one second core lamination group are disposed in a reverse direction so as to be inserted between the magnetic pole tooth portions 18*b* of the other second core lamination group, and are punched out of a strip 25. Moreover, the interfitting apertures 20 are not disposed on the second core laminations 18 that are positioned at the second ends of the second core lamination groups.

Thus, in the first and second core laminations 17 and 18 that are punched out so as to form staggered straight row pair arrangements, spacing τ1 between adjacent width reduced portions 17b2 and 18b2 is wider than a width τ2 of the width expanded portions 17b3 and 18b3. In order to suppress the occurrence of pressing the cutter damage, it is desirable to set τ1≥τ2+2T, where T is the sheet thickness of the strip 25. Moreover, a spacing between the adjacent width reduced portions 17b2 and 18b2 of the first and second core laminations 17 and 18 in the contracted state is narrower than the width τ2 of the width expanded portions 17b3 and 18b3.

Next, a manufacturing method for the armature segments 11 will be explained with reference to FIGS. 11 through 14. Moreover, in FIG. 11, apertures P that function as pilot pin apertures for moving the strip 25 in a direction of rolling that is perpendicular to a width direction of the strip 25 are formed at a pitch of Lp in the direction of rolling on two sides in the width direction of the strip 25.

First, as shown in FIG. 11, slits (hatched portions) for separating the back yoke portions 17a of the first core laminations 17 that are arranged in staggered straight row pairs are punched out (Step (1)). Next, the strip 25 is fed progressively by a pitch Lp, and slits (hatched portions) for separating the back yoke portions 18a of the second core laminations 18 that are arranged in staggered straight row pairs are punched out (Step (2)). Next, the strip 25 is fed progressively by the pitch Lp (Step (3)). Step (3) is a vacant step, in which no machining is applied, that is disposed in order to stabilize the strip 25.

Next, the strip 25 is fed progressively by a pitch Lp, and six first core laminations 17 (hatched portions) that are arranged rectilinearly on a progressing side (upper side in FIG. 11) of a group of first core laminations 17 that are arranged in a staggered straight row pair are punched out (Step (4)). Although not shown, the strip 25 is fed progressively by a pitch Lp, and six second core laminations 18 that are arranged rectilinearly on a progressing side of a group of second core laminations 18 that are arranged in a staggered straight row pair are also punched out (Step (4)).

Next, the strip 25 is fed progressively by the pitch Lp (Step (5)). Step (5) is a vacant step, in which no machining is applied, that is disposed in order to stabilize the strip 25.

Next, the strip 25 is fed progressively by a pitch Lp, and six first core laminations 17 (hatched portions) that are arranged rectilinearly on a trailing side (lower side in FIG. 11) of a group of first core laminations 17 that are arranged in a staggered straight row pair are punched out (Step (6)). Although not shown, the strip 25 is fed progressively by a pitch Lp, and six second core laminations 18 that are arranged rectilinearly on a trailing side of a group of second core laminations 18 that are arranged in a staggered straight row pair are also punched out (Step (6)).

In Step (4), the six second core laminations 18 that are punched out later are stacked on top of the six first core laminations 17 that have been punched out earlier. The shaft portions 19 are thereby inserted into the first interfitting apertures 20a, and the first and second core laminations 17 and 18 are coupled by the punch-crimped portions 17c and 18c.

In Step (6), the six second core laminations 18 that are punched out later are similarly stacked on top of the six first core laminations 17 that have been punched out earlier. The shaft portions 19 are thereby inserted into the first interfitting apertures 20a, and the first and second core laminations 17 and 18 are coupled by the punch-crimped portions 17c and 18c.

Steps (1) through (6) are then repeated for a required number of iterations to produce two core segment linked bodies 15 that are arranged in staggered straight row pairs, as shown in FIG. 12.

The core segment linked bodies 15 that are manufactured in this manner are in the expanded position. Then, the insulators 14 are mounted onto each of the magnetic pole teeth 16b. Next, as shown in FIG. 13, a winding nozzle 27 of a winding machine is rotated to wind the conductor wire 28 onto the magnetic pole teeth 16b onto which the insulators 14 have been mounted. The coils 13a are mounted to all of the magnetic pole teeth 16b to produce an armature segment 11.

Next, as shown in FIG. 14, the core segment linked bodies 15 are displaced to the contracted position, and are pivoted around the shaft portions 19. Thus, all of the core segments 16 are pivoted around the shaft portions 19 to produce an armature segment 11 that is bent into a circular arc shape.

Next, as shown in FIG. 2, three armature segments 11 that are bent into circular arc shapes are disposed in an annular shape. Next, the three armature segment 11 are joined into the annular shape, and the three core segment linked bodies 15 are integrated by welding, producing the armature 10. Moreover, the three armature segments 11 that are connected into the annular shape may be integrated by shrinkage fitting. Furthermore, an inner peripheral surface of the width expanded portions 16b3 forms a circular arc-shaped surface that is centered around the central axis of the annular armature core 12.

In Embodiment 1, the core segments 16 that constitute the core segment linked bodies 15 are displaceable between an expanded position and a contracted position relative to the neighboring core segments 16. Thus, obtaining staggered straight row pairs of core segment linked bodies 15 can be easily achieved by manufacturing the core segment linked bodies 15 with the core segments 16 positioned in the expanded position. Specifically, the spacing between the magnetic pole teeth 16b when the core segments 16 are in the contracted position is narrower than a maximum width (the width of the width expanded portions 16b3) of the magnetic pole teeth 16b. In contrast to that, the spacing between the magnetic pole teeth 16b when the core segments 16 are in the expanded position is wider than the maximum width of the magnetic pole teeth 16b. Because of that, obtaining staggered straight row pairs of core segment linked bodies 15 can be easily achieved by manufacturing the core segment linked bodies 15 with the core segments 16 positioned in the expanded position.

Furthermore, even if the width dimensions of the width expanded portions 16b3 are increased, dimensions by which the core segments 16 displace between the expanded position and the contracted position relative to neighboring core segments 16 can be controlled by adjusting the width dimensions of the width reduced portions 16b2. Because of that, materials yield can be improved when manufacturing the core segment linked bodies 15 with the core segments 16 positioned in the expanded position, enabling productivity to be improved.

Materials yield of the strip 25 is improved thereby, enabling manufacturing costs to be suppressed. Furthermore, by performing mounting of the insulators 14 and mounting (wincing) of the coils 13a when the spacing between the magnetic pole teeth 16b is widened, sufficient space can be ensured for each of the mounting operations, enabling workability to be improved.

In addition, because the shaft portions 19 of the core segments 16 that are linked to each other fit into the first or second interfitting apertures 20a or 20b and will not dislodge (will not separate), handling is facilitated.

In addition, because resistance to movement of the shaft portions 19 from the second interfitting apertures 20b toward the first interfitting apertures 20a is imposed by the spring portions 21, the core segments 16 that are moved to the contracted position can easily be prevented from returning to the expanded position, enabling productivity to be improved.

Because orientation of the first and second core laminations 17 and 18 can be set in a constant direction relative to a drawing direction of the strip 25, the influence of magnetic anisotropy in the strip 25 can be reduced compared to when pressed in a state in which the core laminations are arranged in a circular arc shape or an annular shape, and a 2f component of torque pulsation can be reduced. Moreover, the 2f component of torque pulsation is a component in which two peaks occur in one electrical angular period, and is a component that arises due to the armature 10 becoming irregular due to manufacturing errors.

Figure 16:
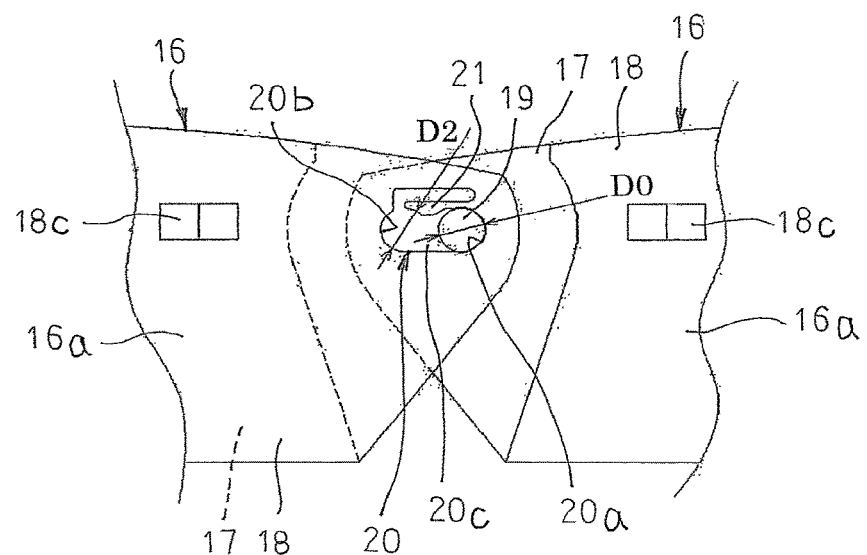
FIG. 16 is a partial plan that explains a relationship between an outside diameter of the shaft portion and an inside diameter of a first interfitting aperture in the core segment linked bodies according to Embodiment 1 of the present invention.
Figure 17:
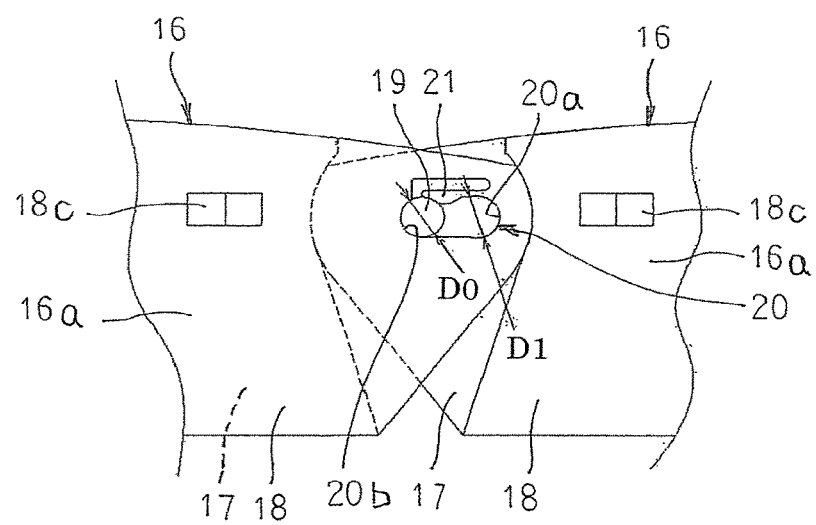
FIG. 17 is a partial plan that explains a relationship between the outside diameter of the shaft portion and an inside diameter of a second interfitting aperture in the core segment linked bodies according to Embodiment 1 of the present invention.
Figure 18:
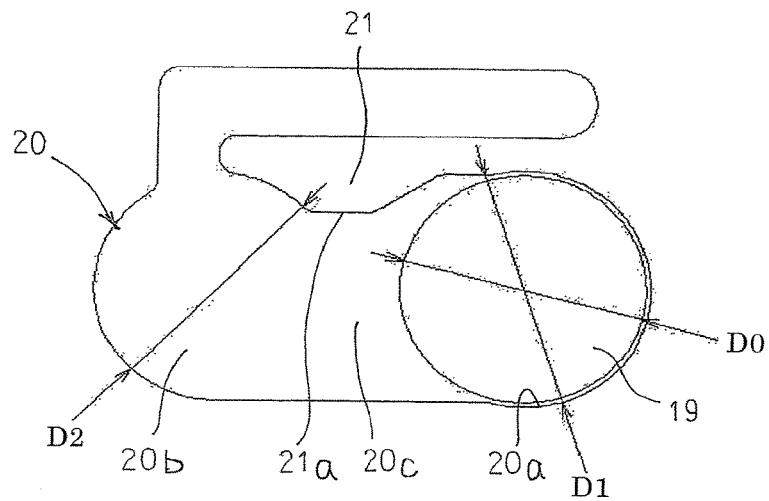
FIG. 18 is a partial plan that shows a variation in which relationships among the outside diameter of the shaft portion, the inside diameter of the first interfitting aperture, and the inside diameter of the second interfitting aperture in the core segment linked bodies according to Embodiment 1 of the present invention are changed.

Now, in Embodiment 1 above, as shown in FIGS. 16 and 17, a relationship among an outside diameter D0 of the shaft portions 19, an inside diameter D1 of the first interfitting apertures 20a, and an inside diameter D2 of the second interfitting apertures 20b is approximately D0=D1=D2. In contrast to that, the relationship may alternatively be set to D0<D2<D1, as shown in FIG. 18, for example. According to the configuration that is shown in FIG. 18, the shaft portions 19 can be easily fitted into the first interfitting apertures 20a when laminating the first core laminations 17 and the second core laminations 18. Because there is an allowance for the outside diameter D0 of the shaft portions 19 in the inside diameter D1 of the first interfitting apertures 20a, the influence of positioning errors between the shaft portions 19 and the first interfitting apertures 20a is reduced, enabling deformation of the shaft portions 19 and the first interfitting apertures 20a due to positioning errors to be suppressed. Positioning errors of the shaft portions 19 can also be reduced when the shaft portions 19 are fitted into the second interfitting apertures 20b. Consequently, the core segment linked bodies 15 can be manufactured precisely.

Furthermore, the shapes of the shaft portions 19 and the interfitting apertures 20 (including the spring portions 21) are not limited to the shapes in Embodiment 1 above, and need only be shapes that enable the core segments 16 to be displaced relative to each other between a contracted position and an expanded position when the shaft portions 19 are fitted together with the interfitting apertures 20, and that enable the respective core segments 16 to be rotated around the shaft portions 19 when positioned in the contracted position.

Figure 15:
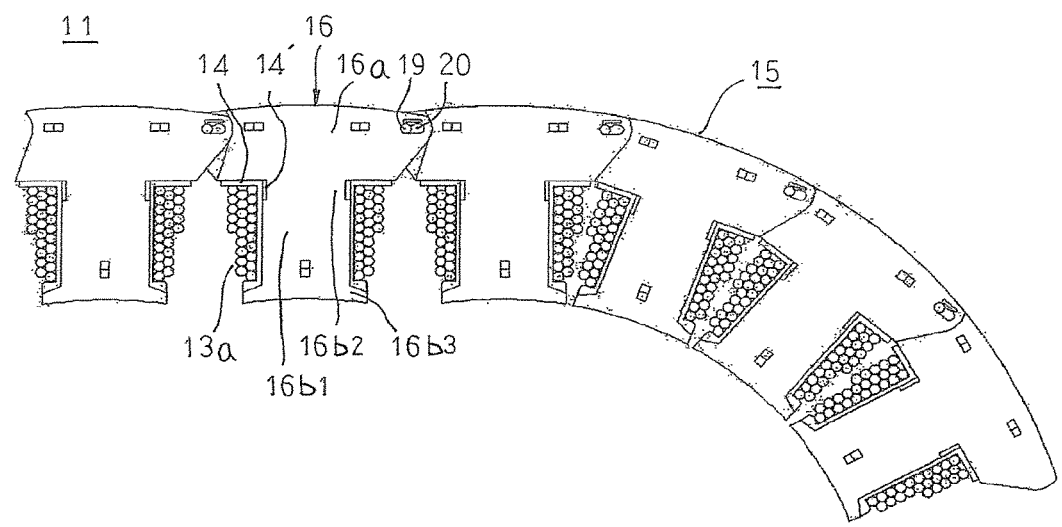
FIG. 15 is a plan that shows a variation of the armature segment according to Embodiment 1 of the present invention.

As shown in FIG. 15, separate insulating members 14' may be fitted into a space between the width reduced portions 16b2 and the insulators 14 instead of the insulators 14 that fit together with the width reduced portions 16b2. If the insulators 14 do not have any strength problems, insulation performance of the coils 13a can also be maintained even if a space is disposed between the width reduced portions 16b2 and the insulators 14.

Next, a relationship between the width reduced portions 16b2 and the width expanded portions 16b3 in the magnetic pole teeth 16b will be investigated from the viewpoint of torque pulsation and torque.

Figure 19:
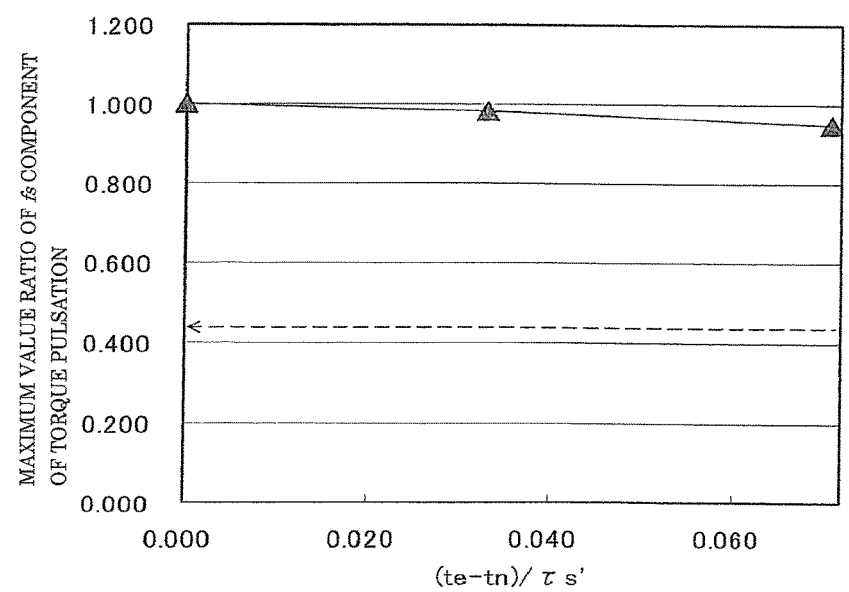
FIG. 19 is a graph that shows a relationship between (te−tn)/τs' and a maximum value ratio of an fs component of torque pulsation in the rotary electric machine according to Embodiment 1 of the present invention.

First, a relationship between (te−tn)/τs' and a maximum value ratio of an fs component of torque pulsation is shown in FIG. 19. Moreover, τs' is a distance between center lines A of adjacent magnetic pole teeth 16b when the core segment linked bodies are opened out rectilinearly, te is a width dimension of the tooth main portions 16b1 that are positioned between the width reduced portions 16b2 and the width expanded portions 16b3 of the magnetic pole teeth 16b, and tn is a width dimension of the width reduced portions 16b2.

The fs component of torque pulsation is a component that is generated by the number of peaks in one mechanical angular period, which is equal to the number of magnetic pole teeth 16b in the armature 10. In other words, the fs component of torque pulsation is a component that is generated due to the waveform of the magnetic flux density that arises due to the permanent magnets 5 of the rotor 2 becoming irregular due to manufacturing errors, etc. Because the rotary electric machine 100 according to Embodiment 1 has sixteen poles and eighteen slots, 2.25 (=18/(16/2)) peaks are generated in one electrical angular period, since eighteen peaks occur in one mechanical angular period.

From FIG. 19, it was found that the fs component of torque pulsation becomes gradually smaller as (te−tn)/τs' increases from zero.

This can be inferred to be because the magnetic pole teeth 16b are saturated magnetically, and the amount of magnetic flux that flows through the magnetic pole teeth 16b is reduced, if the core segment linked bodies 15 are produced so as to satisfy (te−tn)/τs'>0.

From FIG. 19, it was also found that the fs component of torque pulsation can be reduced by greater than or equal to five percent if the core segment linked bodies 15 are produced so as to satisfy (te−tn)/τs'≥0.07.

Figure 20:
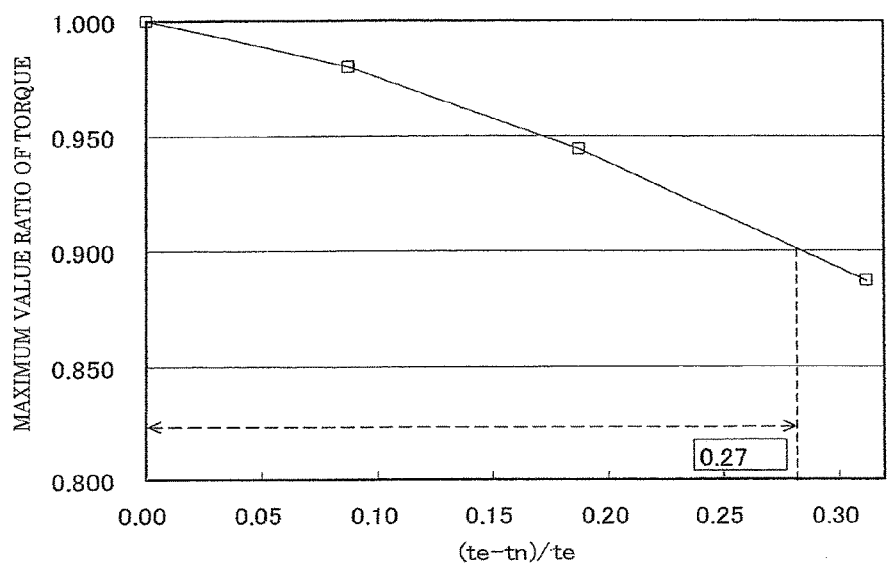
FIG. 20 is a graph that shows a relationship between (te−tn)/te and a maximum value ratio of torque in the rotary electric machine according to Embodiment 1 of the present invention.

Next, a relationship between the maximum value ratio of (te−tn)/te and torque is shown in FIG. 20.

From FIG. 20, it was found that torque gradually becomes smaller as (te−tn)/te increases from zero, and the rate of decline in torque exceeds 10 percent when (te−tn)/te exceeds 0.27. In other words, it can be seen that the rate of decline in torque can be kept to less than or equal to ten percent if 0<(te−tn)/te≤0.27.

This can be inferred to be because a decline in the amount of magnetic flux that flows through the magnetic pole teeth 16b that results from the magnetic pole teeth 16b being saturated magnetically can be suppressed if the core segment linked bodies 15 are produced so as to satisfy 0<(te−tn)/te≤0.27.

Thus, torque reduction can be suppressed even if the width dimensions of the width expanded portions 16b3 at the tip end portions of the magnetic pole teeth 16b are increased, because the width dimensions of the width reduced portions 16b2 can be kept from being reduced by adjusting the distance τs' between the center lines A of the adjacent magnetic pole teeth 16b, and (te−tn), which is the difference between the width dimension te of the tooth main portions 16b1 and the width dimension tn of the width reduced portions 16b2. The fs component of torque pulsation can also be reduced more than when (te−tn)/τs' equals zero even if the width of the width expanded portions 16b3 is increased, because the width dimension of the width reduced portions 16b2 of the magnetic pole teeth 16b can be similarly adjusted.

The distance τs' between the center lines A of the adjacent magnetic pole teeth 16b can also be reduced compared to when there are no width reduced portions 16b2 because the width dimension of the width reduced portions 16b2 can be adjusted, improving materials yield of the strip 25. Materials costs can also be suppressed because the material width of the strip 25 can be reduced.

Moreover, in Embodiment 1, the width reduced portions 16b2 are formed near the back yoke portions 16a of the magnetic pole teeth 16b, i.e., on the root portions of the magnetic pole teeth 16b, but the radial position of the width reduced portions 16b2 on the magnetic pole teeth 16b is not limited to the root portions of the magnetic pole teeth 16b. However, from the viewpoint of improving materials yield, it is desirable for the width reduced portions 16b2 to be formed on the root portions of the magnetic pole teeth 16b.

Figure 21:
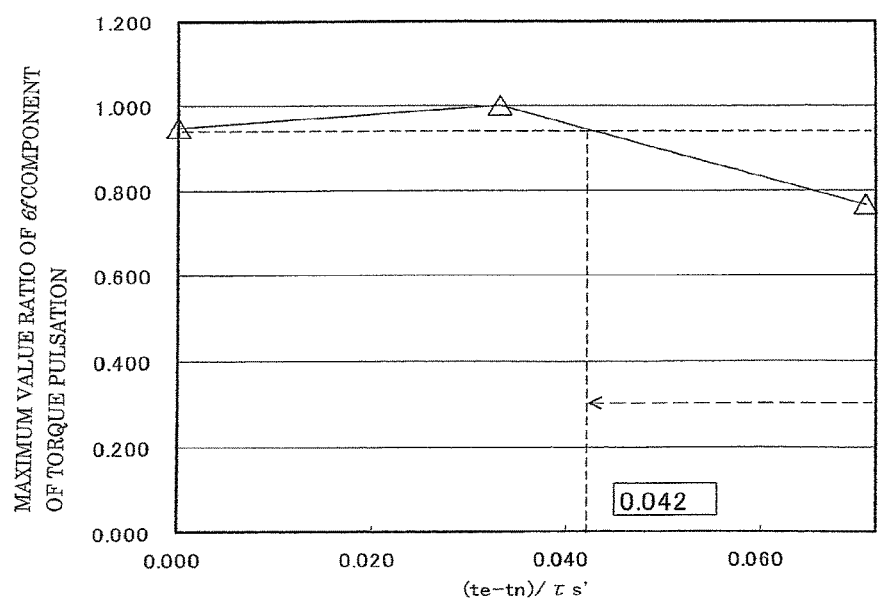
FIG. 21 is a graph that shows a relationship between (te−tn)/τs' and a maximum value ratio of a 6f component of torque pulsation in the rotary electric machine according to Embodiment 1 of the present invention.

Next, a relationship between (te−tn)τs' and a maximum value ratio of a 6f component of torque pulsation is shown in FIG. 21. Moreover, the 6f component of torque pulsation is a component in which six peaks occur in one electrical angular period, and constitutes a major component of torque pulsation that occurs when three-phase alternating current flows through the armature coil 13.

From FIG. 21, it was found that the 6f component of torque pulsation increases gradually as (te−tn)/τs' increases from zero, and the 6f component of torque pulsation reaches a maximum when (te−tn)/τs' is 0.033. It was also found that the 6f component of torque pulsation decreases gradually as (te−tn)/τs' increases beyond 0.033, and become equal to the 6f component of torque pulsation when (te−tn)/τs' is zero when (te−tn)/τs' is 0.042.

This can be inferred to be because the magnetic pole teeth 16b are saturated magnetically, and the amount of magnetic flux that flows through the magnetic pole teeth 16b is reduced, if the core segment linked bodies 15 are produced so as to satisfy (te−tn)/τs'≥0.042. Furthermore, the 6f component of torque pulsation increasing instead of decreasing when the core segment linked bodies 15 are produced so as to satisfy 0<(te−tn)/τs'<0.042 can be inferred to be due to the phases of the fifth-order component $E_5$ of induced voltage, which is the first item in the torque pulsation 6f component $T_6$ that is shown in Expression (1) below, and the seventh-order component $E_7$ of induced voltage, which is the second item, changing in a direction that mutually increases both under the influence of magnetic saturation of the magnetic pole teeth 16b. Moreover, in Expression (1), ωm is the mechanical angular rotational speed of the rotor 2, $E_1$ is the first-order component of induced voltage, $I_1$ is the first-order component of phase current that flows through the armature coil 13, $I_5$ is the fifth-order component, and I7 is the seventh-order component.

$$T_6 = \frac{3}{\omega_m}[I_1 E_5 + I_1 E_7 + I_5 E_1 + I_7 E_1] \quad \text{(Expression 1)}$$

Thus, the 6f component of torque pulsation can be reduced more than when (te−tn)/τs' equals zero even if the width dimensions of the width expanded portions 16b3 of the magnetic pole teeth 16b are increased, because the width dimensions of the width reduced portions 16b2 of the magnetic pole teeth 16b can be adjusted by adjusting the distance τs' between the center lines A between the adjacent magnetic pole teeth 16b, and (te−tn), which is the difference between the width dimension te of the tooth main portions 16b1 and the width dimension tn of the width reduced portions 16b2.

Embodiment 2

Figure 22:
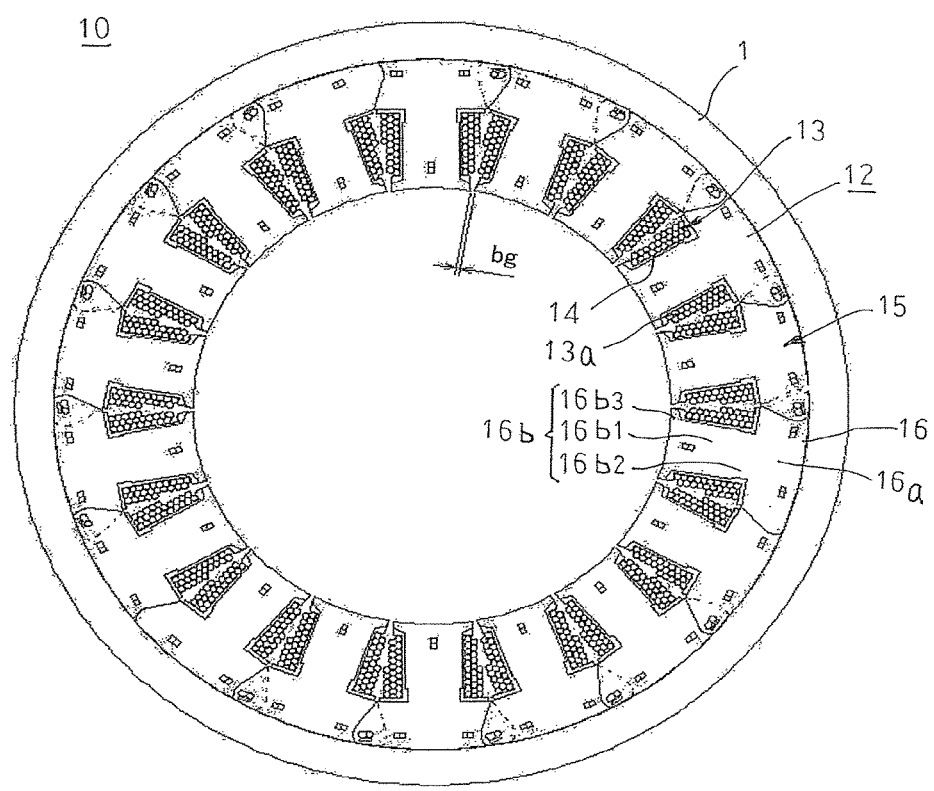
FIG. 22 is a plan that shows an armature in a rotary electric machine according to Embodiment 2 of the present invention.

FIG. 22 is a plan that shows an armature of a rotary electric machine according to Embodiment 2 of the present invention.

In FIG. 22, bg is a circumferential distance between adjacent width expanded portions 16b3 of an armature core 12. Moreover, an armature 10 is configured in a similar or identical manner to that of Embodiment 1 above.

In Embodiment 2, the circumferential distance bg between the adjacent width expanded portion 16b3 of the armature core 12 will be investigated from the viewpoint of the 2f component and the 6f component of torque pulsation.

Figure 23:
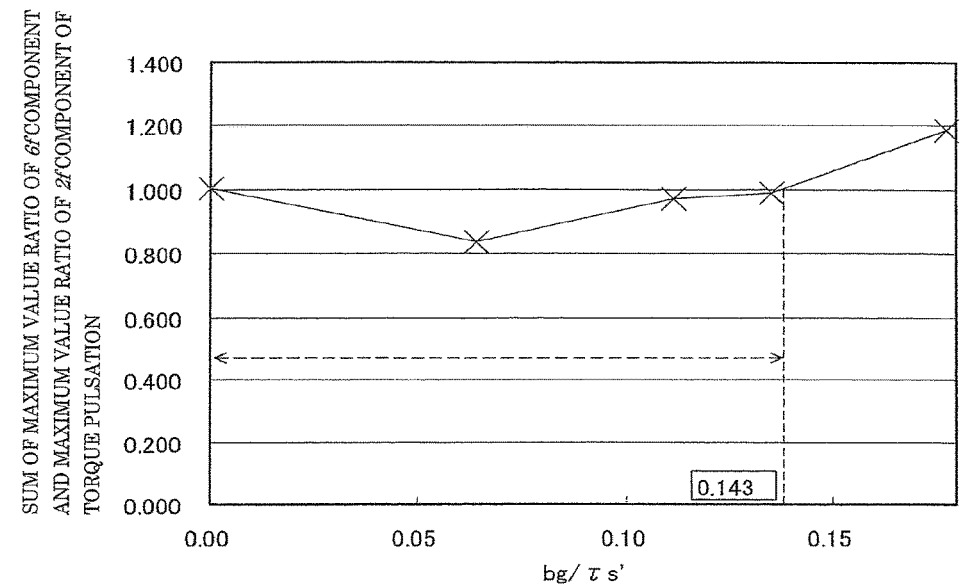
FIG. 23 is a graph that shows a relationship between bg/τs' and a total of a maximum value ratio of a 6f component and a maximum value ratio of a 2f component of torque pulsation in the rotary electric machine according to Embodiment 2 of the present invention.

First, a relationship between bg/τs' and a total of a maximum value ratio of a 6f component and a maximum value ratio of the 2f component of torque pulsation is shown in FIG. 23. A relationship between bg/τs' and a maximum value ratio of the 6f component of torque pulsation and a relationship between bg/τs' and a maximum value ratio of the 2f component of torque pulsation are shown in FIG. 24.

From FIG. 23, it was found that the total sum of a 2f component and a 6f component of torque pulsation becomes gradually smaller as bg/τs' increases from zero, and the total sum of the 2f component and the 6f component of torque pulsation reaches a minimum when bg/τs' is 0.064. It was also found that the total sum of the 2f component and the 6f component of torque pulsation becomes gradually larger as bg/τs' increases from 0.064, and the total sum of the 2f component and the 6f component of torque pulsation becomes equal to when bg/τs' is zero when bg/τs' is 0.143. In other words, it was found that the total sum of the 2f component and the 6f component of torque pulsation is reduced more when 0<bg/τs'≤0.143 than the total sum of the 2f component and the 6f component of torque pulsation when bg/τs' is zero.

Figure 24:
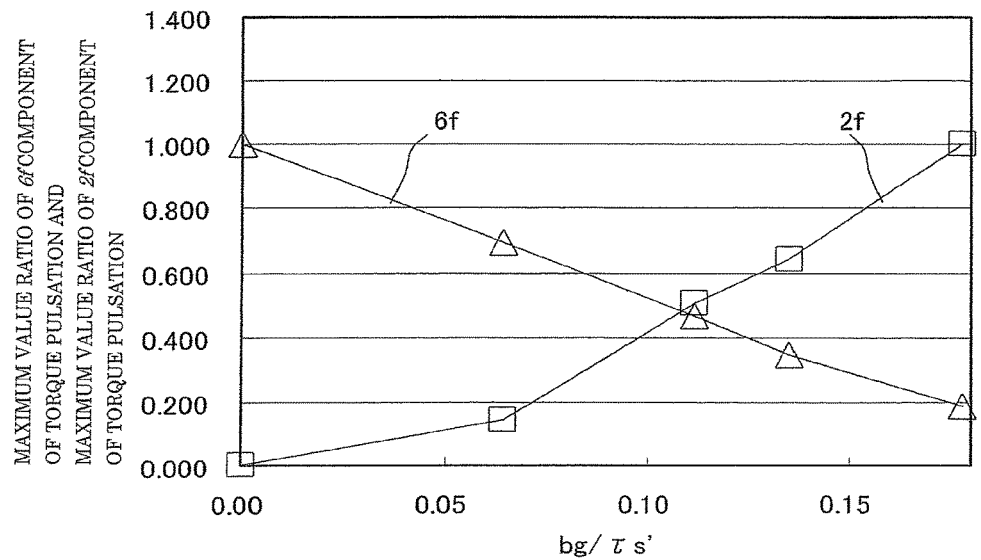
FIG. 24 is a graph that shows relationships between bg/τs' and the maximum value ratio of the 6f component and between bg/τs' and the maximum value ratio of the 2f component of torque pulsation in the rotary electric machine according to Embodiment 2 of the present invention.

Furthermore, from FIG. 24, it was found that when bg/τs' increases, the 6f component of torque pulsation decreases monotonically, and the 2f component of torque pulsation increases monotonically.

Here, the 6f component of torque pulsation decreasing can be inferred to be because the amount of magnetic flux leakage that flows between the width expanded portions 16b3 that constitute the tip end portions of the adjacent magnetic pole teeth 16b is reduced by increasing the distance bg between the width expanded portions 16b3, reducing the 6f component of torque pulsation due to magnetic leakage flux.

The increase in the 2f component of torque pulsation can be inferred to be because the influence that dimensional irregularities in the distance bg between the width expanded portions 16b3 exert on permeance becomes relatively large as the distance bg between the width expanded portions 16b3 increases, and the 2f component of torque pulsation, which is proportional to the magnetic flux density in the air gap between the armature 10 and the rotor 2, which is in turn proportional to permeance, is increased due to that magnetic flux density increasing.

Thus, by adjusting the distance τs' between the center lines A of the adjacent magnetic pole teeth 16b and the distance bg between the width expanded portions 16b3 within a range of 0<bg/τs'≤0.143, the sum of the maximum value ratio of the 6f component and the maximum value ratio of the 2f component of torque pulsation can be made smaller than when bg/τs' equals zero, and can be minimized when bg/τs' equals 0.064.

Furthermore, as the distance bg between the width expanded portions 16b3 increases within a range of bg/τs' that satisfies 0<bg/τs'≤0.143, torque increases, and cogging torque, which is torque pulsation during no-load can be reduced as the distance bg between the width expanded portions 16b3 is reduced.

Embodiment 3

Figure 25:
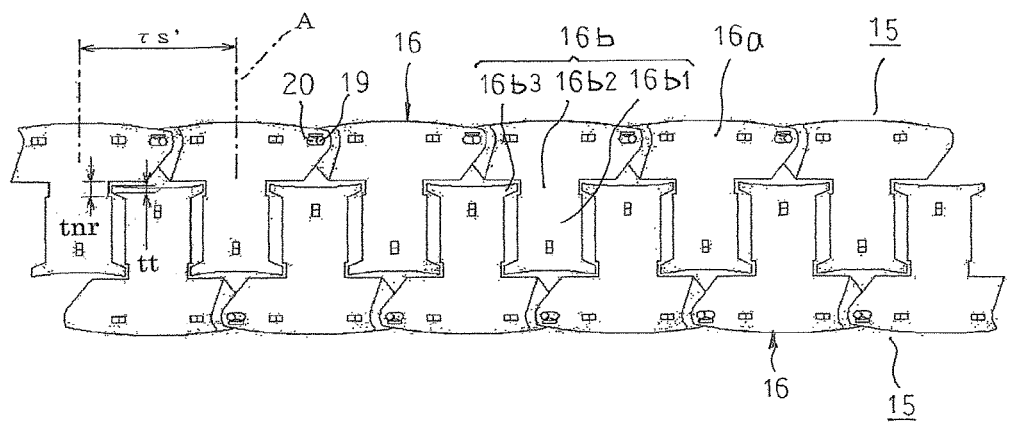
FIG. 25 is a plan that shows a state of core segment linked bodies immediately after assembly in a rotary electric machine according to Embodiment 3 of the present invention.

FIG. 25 is a plan that shows a state of core segment linked bodies immediately after assembly in a rotary electric machine according to Embodiment 3 of the present invention.

In FIG. 25, tt is a radial dimension at two circumferential ends of width expanded portions 16b3 of core segments 16, and tnr is a radial dimension of width reduced portions 16b2. In order to enable a staggered straight row pair of core segment linked bodies 15 to be obtained, the radial dimension tt at the two circumferential ends of the width expanded portions 16b3 is set so as to be less than the radial dimension tnr of the width reduced portions 16b2, to avoid interference between the magnetic pole teeth 16b. Moreover, an armature 10 is configured in a similar or identical manner to that of Embodiment 1 above.

In Embodiment 3, the radial dimension tt at the two circumferential ends of width expanded portions 16b3 of the core segments 16, and the radial dimension tnr of the width reduced portions 16b2 will be investigated from the viewpoint of the 2f component and the 6f component of torque pulsation.

Figure 26:
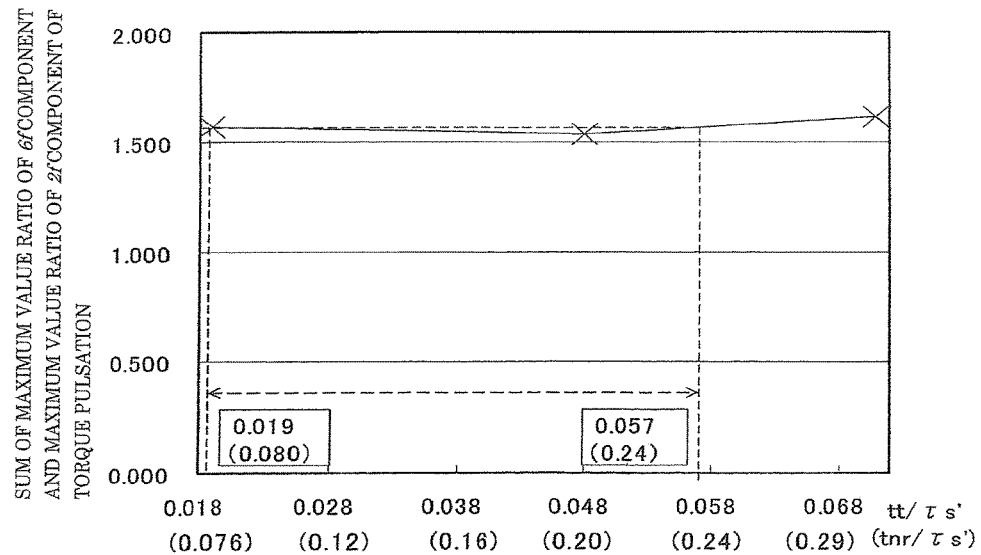
FIG. 26 is a graph that shows relationships between tt/τs' and tnr/τs' and a total of a maximum value ratio of a 6f component and a maximum value ratio of a 2f component of torque pulsation in the rotary electric machine according to Embodiment 3 of the present invention.

First, relationships between tt/τs' and tnr/τs' and a total of a maximum value ratio of the 6f component and a maximum value ratio of the 2f component of torque pulsation are shown in FIG. 26. A relationship between ft/τs' and tnr/τs' and a maximum value ratio of the 6f component of torque pulsation and a relationship between ft/τs' and tnr/τs' and a maximum value ratio of the 2f component of torque pulsation are shown in FIG. 27.

From FIG. 26, it was found that the total sum of the maximum value ratio of the 6f component and the maximum value ratio of the 2f component of torque pulsation becomes gradually smaller as tt/τs' increases from 0.019 (tnr/τs' from 0.076), and that the total sum of the maximum value ratio of the 6f component of torque pulsation and the maximum value ratio of the 2f component reaches a minimum when tt/τs' is 0.048 (tnr/τs' is 0.20). It was also found that the total sum of the maximum value ratio of the 6f component and the maximum value ratio of the 2f component of torque pulsation increases gradually as tt/τs' increases from 0.048 (tnr/τs' from 0.20). In other words, it was found that when $0.019 \leq tt/τs' \leq 0.057$, and $0.08 \leq tnr/τs' \leq 0.24$, the total sum of the maximum value ratio of the 6f component and the maximum value ratio of the 2f component of torque pulsation can be reduced more than the total sum of the maximum value ratio of the 6f component and the maximum value ratio of the 2f component of torque pulsation when tt/τs' is 0.019 and tnr/τs' is 0.08. Moreover, tt/τs'=0.019 and tnr/τs'=0.08 are representative values that are very close to zero.

Figure 27:
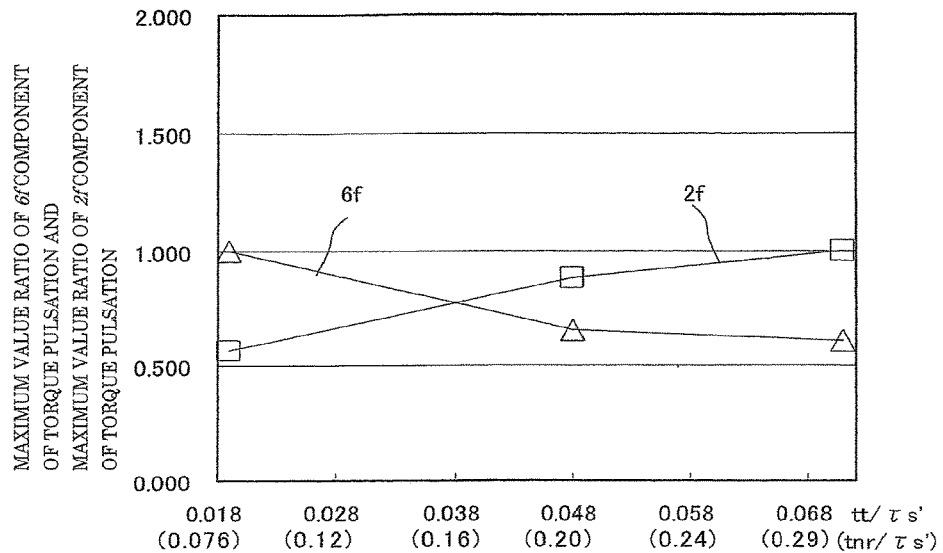
FIG. 27 is a graph that shows relationships between tt/τs' and tnr/τs' and the maximum value ratio of the 6f component and between tt/τs' and tnr/τs' and the maximum value ratio of the 2f component of torque pulsation in the rotary electric machine according to Embodiment 3 of the present invention.

Furthermore, from FIG. 27, it was found that when the radial dimension tt at the two circumferential ends of width expanded portions 16b3 of the core segments 16, and the radial dimension tnr of the width reduced portions 16b2 increase, the 6f component of torque pulsation decreases monotonically, and the 2f component of torque pulsation increases monotonically.

Here, the 6f component of torque pulsation decreasing can be inferred to be because the amount of magnetic flux that flows to the magnetic pole teeth 16b decreases due to the magnetic pole teeth 16b being saturated magnetically by increasing the radial dimension tnr of the width reduced portions 16b2.

The increase in the 2f component of torque pulsation can be inferred to be because the influence that dimensional irregularities in the radial dimension tt at the two circumferential ends of the width expanded portions 16b3 exert on permeance becomes relatively large as the radial dimension tt at the two circumferential ends of the width expanded portions 16b3 increases, and the 2f component of torque pulsation, which is proportional to the magnetic flux density in the air gap between the armature 10 and the rotor 2, which is in turn proportional to permeance, is increased due to that magnetic flux density increasing.

Thus, by adjusting the distance τs' between the adjacent magnetic pole teeth 16b, the radial dimension tt at the two circumferential ends of the width expanded portions, and the radial dimension tnr of the width reduced portions within ranges of $0.019 \leq tt/τs' \leq 0.057$ and $0.08 \leq tnr/τs' \leq 0.24$, the sum of the maximum value ratio of the 6f component and the maximum value ratio of the 2f component of torque pulsation can be reduced more than when tt/τs' is 0.019 and tnr/τs' is 0.08, and when tt/τs'=0.048 and tnr/τs'=0.2.

Furthermore, torque can be increased within ranges of $0.019 \leq tt/τs' \leq 0.048$ and $0.08 \leq tnr/τs' \leq 0.2$, compared to when tt/τs' is less than 0.048 and tnr/τs' is less than 0.2.

Embodiment 4

FIG. 24 is a graph that shows relationships between bg/τs' and the maximum value ratio of the 6f component and between bg/τs' and the maximum value ratio of the 2f component of torque pulsation in the rotary electric machine according to Embodiment 2 of the present invention.

Figure 28:
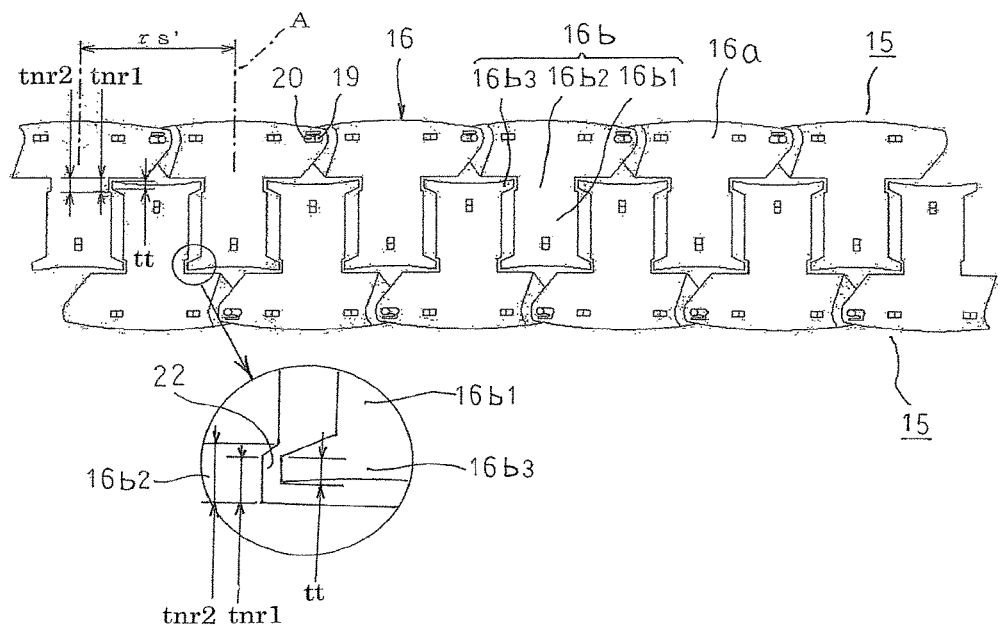
FIG. 28 is a plan that shows a state of core segment linked bodies immediately after assembly in a rotary electric machine according to Embodiment 4 of the present invention.

In FIG. 28, notch portions 22 that are formed on two sides in a width direction of width reduced portions 16b2 of core segments 16 are formed so as to have cross-sectional shapes perpendicular to a plane that includes a center line A of magnetic pole teeth 16b that are constituted by: a base side that is parallel to the center line A of a magnetic pole tooth 16b; an upper side that is perpendicular to the center line A near a back yoke portion 6a; and a lower side that displaces away from the center line A toward a width expanded portion 16b3. In other words, inner wall surfaces of the notch portions 22 that extend circumferentially near the width expanded portions 16b3 are inclined so as to lie alongside outer wall surfaces of the width expanded portions 16b3 of the adjacent magnetic pole teeth 16b that extend circumferentially near the back yoke portions 16a when obtaining core segment linked bodies 15 as staggered straight row pairs.

Moreover, the rest of the configuration is formed in a similar or identical manner to that of Embodiment 1 above.

In Embodiment 4, the inner wall surfaces of the notch portions 22 that form the width reduced portions 16b2 that extend circumferentially near the back yoke portions 16a extend in directions that are perpendicular to the center lines A (radial directions) of the magnetic pole teeth 16b, and inner wall surfaces of the notch portions 22 that extend circumferentially near the width expanded portions 16b3 are inclined so as to lie alongside outer wall surfaces of the width expanded portions 16b3 of the adjacent magnetic pole teeth 16b that extend circumferentially near the back yoke portions 16a. Thus, if tnr1 is the maximum radial width of the width reduced portions 16b2 and tnr2 is the minimum radial width, then the radial dimension tnr of the width reduced portions 16b2 is tnr=(tnr1+tnr2)/2.

Here, the inner wall surfaces of the notch portions 22 that form the width expanded portions 16b3 that extend circumferentially near the width expanded portions 16b3 are formed into inclined surfaces that displace toward the width expanded portions 16b3 away from the center line A. In order to avoid interference between adjacent magnetic pole teeth 16*b* when obtaining core segment linked bodies 15 as staggered straight row pairs, it is necessary to increase the openings of the notch portions 22 that form the width reduced portions 16*b*2. Thus, if the inner wall surfaces of the notch portions 22 that extend circumferentially near the width expanded portions 16*b*3 and near the back yoke portions 16*a* extend in directions that are perpendicular to the center line A, then the radial widths of the width reduced portions 16*b*2 become tnr2.

In Embodiment 4, since tnr1 is less than tnr2, torque can be increased compared to when the inner wall surfaces of the width reduced portions 16*b*2 that extend circumferentially near the width expanded portions 16*b*3 are perpendicular to the center line A, because they are less than tnr2.

Embodiment 5

Figure 29:
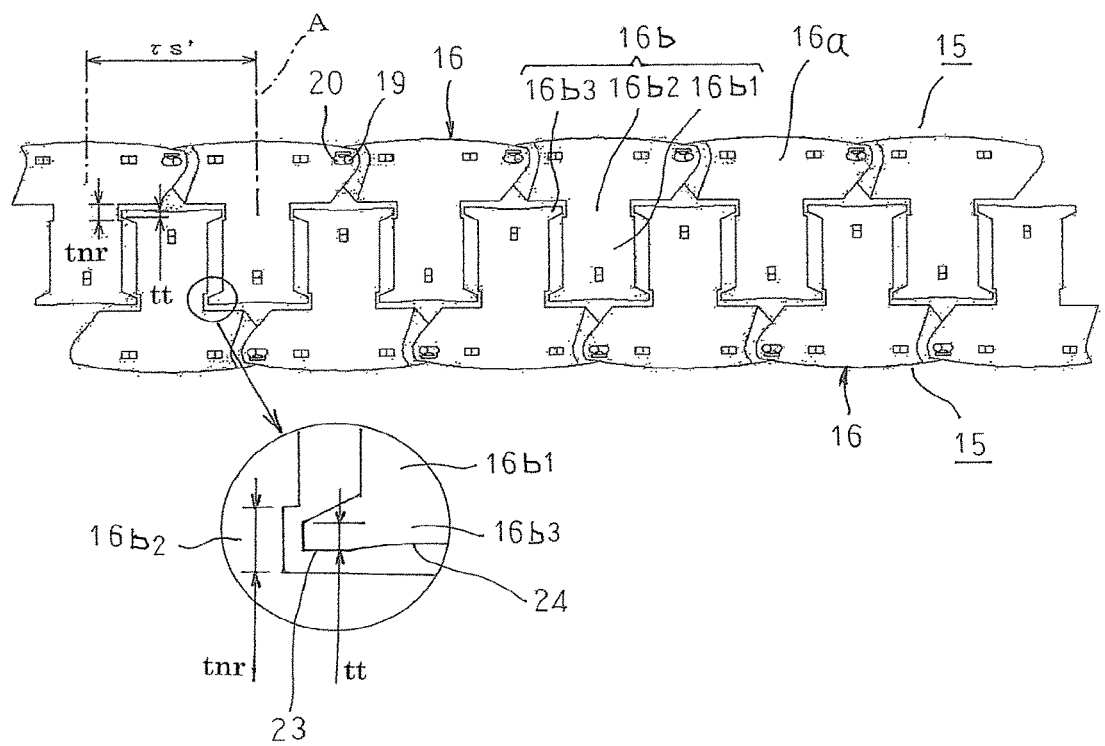
FIG. 29 is a plan that shows a state of core segment linked bodies immediately after assembly in a rotary electric machine according to Embodiment 5 of the present invention.

FIG. 29 is a plan that shows a state of core segment linked bodies immediately after assembly in a rotary electric machine according to Embodiment 5 of the present invention.

In FIG. 29, two circumferential end portions of surfaces of width expanded portions 16*b*3 of core segments 16 that face radially inward (inner circumferential surfaces) are formed into flat surfaces 23 that are perpendicular to a center line A, and the inner circumferential surfaces are formed into circular arc-shaped surfaces 24 that are centered around a central axis of an armature core between the flat surfaces 23.

Moreover, the rest of the configuration is formed in a similar or identical manner to that of Embodiment 1 above.

In Embodiment 5, two circumferential end portions of inner circumferential surfaces of width expanded portions 16*b*3 of core segments 16 are formed into flat surfaces 23 that are perpendicular to a center line A. Thus, the flat surfaces 23 of the respective core segments 16 are positioned on an identical plane when the core segment linked bodies 15 are opened out rectilinearly such that the magnetic pole teeth 16*b* are mutually parallel. Thus, the surface that is formed by the flat surfaces 23 can be used as a control reference surface when performing dimensional inspections of the core segment linked bodies 15, enabling dimensional inspections to be performed easily, thereby enabling a highly reliable rotary electric machine armature core to be obtained. Furthermore, torque can be increased because radial dimensions tt at the two circumferential ends of the width expanded portions 16*b*3 can be reduced.

Moreover, in each of the embodiments, a rotary electric machine that has sixteen poles and eighteen slots has been explained, but the number of poles and number of slots are not limited thereto.

In each of the embodiments, cases in which a distance τs between the center lines A of the adjacent magnetic pole teeth 16*b* when the core segments are in a contracted position is less than a distance τs' between the center lines A of the adjacent magnetic pole teeth when the core segments are in an expanded position have been explained, but the distance τS between the center lines A of the adjacent magnetic pole teeth when the core segments are in the contracted position may be equal to the distance τs' between the center lines A of the adjacent magnetic pole teeth when the core segments are in the expanded position. In that case, τs' should be replaced with τs in each of the expressions in Embodiments 1 through 3.

In each of the above embodiments, core segment linked bodies are configured by linking six core segments, but the number of core segments that constitute the core segment linked bodies is not limited to six. If the core segment linked bodies are constituted by nine core segments, for example, the armature core is constituted by two core segment linked bodies.

In each of the above embodiments, all of the armature segments that constitute the armature core are constituted by core segment linked bodies that include six core segments, but the armature core may be constituted by a plurality of kinds of core segment linked bodies that are constituted by different numbers of core segments.

The invention claimed is:

1. A rotary electric machine armature core comprising a core segment linked body that is configured by linking a plurality of core segments that each have a T shape that comprises a back yoke portion and a magnetic pole tooth that protrudes from a central portion of said back yoke portion, wherein:

a shaft portion is formed on a first longitudinal end portion of said back yoke portion, and an interfitting aperture is formed on a second end portion of said back yoke portion;

said magnetic pole tooth comprises:
   a tooth main portion that protrudes outward from said back yoke portion;
   a width reduced portion that is formed on said tooth main portion near said back yoke portion, said width reduced portion having a width dimension that is narrower than a width dimension of said tooth main portion; and
   a width expanded portion that is formed on a protruding end of said tooth main portion, said width expanded portion having a width dimension that is wider than a width dimension of said tooth main portion;

said plurality of core segments are configured so as to be linked pivotably around said shaft portion by fitting said shaft portion of one of said core segments into said interfitting aperture of an adjacent core segment, so as to adopt a state that is opened out rectilinearly such that directions of protrusion of said magnetic pole teeth from said back yoke portions are parallel to each other and a state that is pivoted around said shaft portion so as to be bent into an arc shape; and said core segment linked body when opened out rectilinearly is configured so as to satisfy $(te-tn)/\tau s' > 0$, and $0 < (te-tn)/te \leq 0.27$, where $\tau s'$ is a distance between center lines of said adjacent magnetic pole teeth, te is a width dimension of said tooth main portions, and tn is said width dimension of said width reduced portions.

2. The rotary electric machine armature core according to claim 1, wherein said core segment linked body is configured so as to satisfy $(te-tn)/\tau s' \geq 0.07$.

3. The rotary electric machine armature core according to claim 1, wherein said core segment linked body is configured so as to satisfy $(te-tn)/\tau s' \geq 0.042$.

4. The rotary electric machine armature core according to claim 1, wherein said core segment linked body is configured so as to satisfy $0 < bg/\tau s' \leq 0.143$, where bg is a distance between adjacent width expanded portions when said core segment linked body is linked into an annular shape.

5. The rotary electric machine armature core according to claim 1, wherein said core segment linked body is configured so as to satisfy $0.019 \leq tt/\tau s' \leq 0.057$ and $0.08 \leq tnr/\tau s' \leq 0.24$, where tt is a radial dimension of two circumferential end portions of said width expanded portion, and tnr is a radial dimension of said width reduced portion.

6. The rotary electric machine armature core according to claim 1, wherein said core segment linked body is configured so as to satisfy $0.019 \leq tt/\tau s' \leq 0.048$ and $0.08 \leq tnr/\tau s' \leq 0.2$, where tt is a radial dimension of two circumferential end portions of said width expanded portion, and tnr is a radial dimension of said width reduced portion.

7. The rotary electric machine armature core according to claim 1, wherein:
said width reduced portion is formed by notching two sides in a width direction of said magnetic pole tooth; and
a cross-sectional shape of notch portions that are formed on said two sides in said width direction of said magnetic pole tooth that is perpendicular to a plane that includes a center line of said magnetic pole tooth is formed into a cross-sectional shape that comprises:
a base side that is parallel to said center line of said magnetic pole tooth;
an upper side that is positioned near said back yoke portion, said upper side being perpendicular to said center line of said magnetic pole tooth; and
a lower side that is positioned near said width expanded portion, said upper side displacing toward said width expanded portion away from said center line of said magnetic pole tooth.

8. The rotary electric machine armature core according to claim 1, wherein an inner circumferential surface of said width expanded portion is constituted by:
a circular arc-shaped surface that is centered around a central axis when said core segment linked body is linked into an annular shape; and
flat surfaces that are perpendicular to a center line of said magnetic pole tooth, said flat surfaces being formed on two sides of said circular arc-shaped surface in a width direction.

9. A rotary electric machine comprising:
an armature that comprises:
said armature core according to claim 1; and
an armature coil that is mounted to said magnetic pole teeth; and
a rotor that is disposed so as to be coaxial to said armature so as to be rotatable around an axis.

10. A rotary electric machine armature core comprising a core segment linked body that is configured by linking a plurality of core segments that each have a T shape that comprises a back yoke portion and a magnetic pole tooth that protrudes from a central portion of said back yoke portion, wherein:
a shaft portion is formed on a first longitudinal end portion of said back yoke portion, and an interfitting aperture is formed on a second end portion of said back yoke portion;
said magnetic pole tooth comprises:
a tooth main portion that protrudes outward from said back yoke portion;
a width reduced portion that is formed on said tooth main portion near said back yoke portion, said width reduced portion having a width dimension that is narrower than a width dimension of said tooth main portion; and
a width expanded portion that is formed on a protruding end of said tooth main portion, said width expanded portion having a width dimension that is wider than a width dimension of said tooth main portion;
said plurality of core segments are configured so as to be linked pivotably around said shaft portion by fitting said shaft portion of one of said core segments into said interfitting aperture of an adjacent core segment, so as to adopt a state that is opened out rectilinearly such that directions of protrusion of said magnetic pole teeth from said back yoke portions are parallel to each other and a state that is pivoted around said shaft portion so as to be bent into an arc shape;
said core segment linked body is configured so as to be displaceable in said state that is opened out rectilinearly between an expanded position in which a distance between center lines of said magnetic pole teeth of adjacent core segments is expanded and a contracted position in which said distance is contracted; and
said core segment linked body when opened out rectilinearly is configured:
such that a distance between adjacent width reduced portions is greater than a width dimension of said width expanded portions when said adjacent core segments are in said expanded position, and said distance between said adjacent width reduced portions is less than said width dimension of said width expanded portions when said adjacent core segments are in said contracted position; and
so as to satisfy $(te-tn)/\tau s'>0$, and $0<(te-tn)/te\leq0.27$, where $\tau s'$ is said distance between said center lines of said adjacent magnetic pole teeth in said expanded position, te is a width dimension of said tooth main portions, and tn is said width dimension of said width reduced portions.

11. The rotary electric machine armature core according to claim 10, wherein said core segment linked body is configured so as to satisfy $(te-tn)/\tau s'\geq0.07$.

12. The rotary electric machine armature core according to claim 10, wherein said core segment linked body is configured so as to satisfy $(te-tn)/\tau s'\geq0.042$.

13. The rotary electric machine armature core according to claim 10, wherein said core segment linked body is configured so as to satisfy $0<bg/\tau s'\leq0.143$, where bg is a distance between adjacent width expanded portions when said core segment linked body is linked into an annular shape.

14. The rotary electric machine armature core according to claim 10, wherein said core segment linked body is configured so as to satisfy $0.019\leq tt/\tau s'\leq0.057$ and $0.08\leq tnr/\tau s'\leq0.24$, where tt is a radial dimension of two circumferential end portions of said width expanded portion, and tnr is a radial dimension of said width reduced portion.

15. The rotary electric machine armature core according to claim 10, wherein said core segment linked body is configured so as to satisfy $0.019\leq tt/\tau s'\leq0.048$ and $0.08\leq tnr/\tau s'\leq0.2$, where tt is a radial dimension of two circumferential end portions of said width expanded portion, and tnr is a radial dimension of said width reduced portion.

16. The rotary electric machine armature core according to claim 10, wherein:
said width reduced portion is formed by notching two sides in a width direction of said magnetic pole tooth; and
a cross-sectional shape of notch portions that are formed on said two sides in said width direction of said magnetic pole tooth that is perpendicular to a plane that includes a center line of said magnetic pole tooth is formed into a cross-sectional shape that comprises:
a base side that is parallel to said center line of said magnetic pole tooth;
an upper side that is positioned near said back yoke portion, said upper side being perpendicular to said center line of said magnetic pole tooth; and a lower side that is positioned near said width expanded portion, said upper side displacing toward said width expanded portion away from said center line of said magnetic pole tooth.

17. The rotary electric machine armature core according to claim 10, wherein an inner circumferential surface of said width expanded portion is constituted by:
a circular arc-shaped surface that is centered around a central axis when said core segment linked body is linked into an annular shape; and
flat surfaces that are perpendicular to a center line of said magnetic pole tooth, said flat surfaces being formed on two sides of said circular arc-shaped surface in a width direction.

18. A rotary electric machine comprising:
an armature that comprises:
said armature core according to claim 10; and
an armature coil that is mounted to said magnetic pole teeth; and
a rotor that is disposed so as to be coaxial to said armature so as to be rotatable around an axis.

* * * * *